(12) United States Patent
Kudo et al.

(10) Patent No.: US 11,039,132 B2
(45) Date of Patent: Jun. 15, 2021

(54) CODE AMOUNT ESTIMATION DEVICE, CODE AMOUNT ESTIMATION METHOD, AND CODE AMOUNT ESTIMATION PROGRAM

(71) Applicant: NIPPON TELEGRAPH AND TELEPHONE CORPORATION, Tokyo (JP)

(72) Inventors: Shinobu Kudo, Yokosuka (JP); Masaki Kitahara, Yokosuka (JP); Atsushi Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/978,068

(22) PCT Filed: Mar. 4, 2019

(86) PCT No.: PCT/JP2019/008366
§ 371 (c)(1),
(2) Date: Sep. 3, 2020

(87) PCT Pub. No.: WO2019/172179
PCT Pub. Date: Sep. 12, 2019

(65) Prior Publication Data
US 2020/0413052 A1 Dec. 31, 2020

(30) Foreign Application Priority Data
Mar. 6, 2018 (JP) .............................. JP2018-039903

(51) Int. Cl.
*H04N 7/12* (2006.01)
*H04N 19/115* (2014.01)
(Continued)

(52) U.S. Cl.
CPC ......... *H04N 19/115* (2014.11); *H04N 19/124* (2014.11); *H04N 19/14* (2014.11); *H04N 19/149* (2014.11)

(58) Field of Classification Search
CPC .... H04N 19/115; H04N 19/124; H04N 19/14; H04N 19/149
(Continued)

(56) References Cited

U.S. PATENT DOCUMENTS

| 2003/0007559 A1* | 1/2003 | Lallet ................... H04N 19/192 375/240.03 |
| 2004/0141732 A1* | 7/2004 | Sugiyama ............ H04N 19/152 386/263 |

(Continued)

FOREIGN PATENT DOCUMENTS

| JP | 2003153268 A | 5/2003 |
| JP | 2010503245 A | 1/2010 |
| WO | WO-2008044511 A1 | 4/2008 |

OTHER PUBLICATIONS

Yasuda Hiroshi et al., Digital image compression, Nikkei Business Publications, Inc., Jan. 20, 1996.
(Continued)

*Primary Examiner* — Gims S Philippe
(74) *Attorney, Agent, or Firm* — Harness, Dickey & Pierce, P.L.C.

(57) ABSTRACT

A code amount estimation device includes a code amount estimation unit configured to estimate a first target code amount on the basis of a first code amount estimation area in first image information and a code amount estimation model for estimating the first target code amount for each first code amount estimation area using the first code amount estimation area and multiple first quantization parameters determined in advance, and the code amount estimation model is a model generated by associating a second code
(Continued)

amount estimation area in second image information, multiple second quantization parameters, and a second target code amount for each second code amount estimation area when coding is performed with respective values of multiple second quantization parameters with each other.

5 Claims, 16 Drawing Sheets

(51) Int. Cl.
      *H04N 19/124*     (2014.01)
      *H04N 19/14*      (2014.01)
      *H04N 19/149*     (2014.01)

(58) Field of Classification Search
      USPC .................................................. 375/240.03
      See application file for complete search history.

(56) References Cited

U.S. PATENT DOCUMENTS

2010/0118937 A1*   5/2010   Shimizu ............... H04N 19/115
                                                                 375/240.03
2019/0200024 A1*   6/2019   Kubota ................ H04N 19/172

OTHER PUBLICATIONS

Miaohui Wang et al., An Efficient Frame-Content Based Intra Frame Rate Control for High Efficiency Video Coding, IEEE Signal Processing Letters, vol. 22, No. 7, pp. 896-900, Jul. 2015.

* cited by examiner

CODE AMOUNT ESTIMATION DEVICE, CODE AMOUNT ESTIMATION METHOD, AND CODE AMOUNT ESTIMATION PROGRAM

CROSS-REFERENCE TO RELATED APPLICATIONS

This application is a 371 National Stage of International Application No. PCT/JP2019/008366, filed on Mar. 4, 2019, which claims priority to Japanese Patent Application No. 2018-039903, filed Mar. 6, 2018. The entire disclosures of the above applications are incorporated herein by reference.

TECHNICAL FIELD

The invention relates to a code amount estimation device, a code amount estimation method, and a code amount estimation program.

BACKGROUND ART

When a video is coded, it is desirable to control a code amount so that a generated code amount can be kept within a desired bit rate or file size while maintaining image quality. For example, in the Moving Picture Experts Group (MPEG) 2 test model 5 (hereinafter referred to as "related work 1"), a code amount assigned to a coding target picture is evenly assigned to respective coded block images in the picture, and the respective block images in the picture are sequentially coded. In this process, code amount control is realized by controlling a quantization step according to a difference between a target code amount and an actually generated code amount (see Non-Patent Literature 1, for example). A specific calculation scheme will be described hereinafter. First, a fullness d(j) of a virtual buffer is calculated using Equation (1) below before a j-th block image is coded.

[Math. 1]

$$d(j)=(d(0)+B(j-1)-T\times(j-1)/\text{Blk\_cnt} \quad (1)$$

In Equation (1), d(0) denotes an initial buffer value, and B(j) denotes the number of coded generated bits of all block images so far including the j-th block image. Further, T denotes a target number of bits of a coding target picture, and Blk_cnt denotes the number of blocks in the coding target picture. An initial quantization step Q(j) is obtained using Equation (2) below.

[Math. 2]

$$Q(j)=d(j)\times 31/r \quad (2)$$

In Equation (2), r is obtained using below Equation (3).

[Math. 3]

$$r=2\times \text{Bit\_rate}/\text{Picture\_rate} \quad (3)$$

In Equation (3), Bit_rate is a bit rate of a video signal, and Picture_rate is the number of pictures included in one second of the video signal. When only one picture is coded, Bit_rate=T and Picture_rate=1.

A value changed according to an activity for each block image as in Equation (4) below is obtained as a final quantization step Mq(j).

[Math. 4]

$$M_q(j)=Q(j)\times N_{act}(j) \quad (4)$$

In Equation (4), Nact(j) is obtained using Equation (5) below.

[Math. 5]

$$N_{act}(j)=(2\times \text{act}(j)+\text{avg}_{act})/(\text{act}(j)+2\times \text{avg}_{act}) \quad (5)$$

In Equation (5), act(j) is obtained using Equation (6) below, and avgact is an average value of act(j) of a picture at a previous time. In Equation (6) below, Pk is a pixel value of a pixel included in a block image.

[Math. 6]

$$\begin{aligned} \text{act}(j) &= 1 + \min(Var_{sblk}) \\ sblk &= 1, \ldots, 4 \\ Var_{sblk} &= \sum_{k=1}^{64}(P_k - P_{mean})^2/64 \\ P_{mean} &= \sum_{k=1}^{64} P_k/64 \end{aligned} \quad (6)$$

However, a configuration in related work 1 above corresponds to a configuration in which a code amount assigned to the coding target picture is distributed to each block image. Therefore, when an area easy to code and an area difficult to code coexist in the picture, the same code amount is assigned even though required code amounts for the same image quality are different. The area is, for example, an area divided by separate block images.

As a result, in related work 1, there was a problem that the image quality in the picture could not be kept uniform. Therefore, a scheme for solving this problem (hereinafter referred to as "related work 2") has been proposed (for example, see Non-Patent Literature 2).

In related work 2, the following calculation scheme is adopted.

Step 1: A pixel value difference norm GPP for each block image is calculated using Equation (7) below, and a GPP corresponding to each block image is set as GPP(k) (where k=1 to Blk_cnt). In Equation (7) below, H denotes a height of an image and W denotes a width of the image. $I_{i,j}$ denotes a pixel value located at coordinates i,j. The pixel value difference norm GPP(k) is a value indicating coding difficulty.

[Math. 7]

$$GPP = \frac{1}{H\times W}\sum_{i=0}^{H-1}\sum_{j=0}^{W-1}(|I_{i,j}-I_{i+1,j}|+|I_{i,j}-I_{i,j+1}|) \quad (7)$$

Step 2: A code amount according to the coding difficulty is assigned to each block image on the basis of Equation (8) below.

[Math. 8]

$$T(k) = \text{Remaining picture code amount}\times \frac{GPP(k)}{\sum_i GPP(k)} \quad (8)$$

Step 3: A quantization parameter (hereinafter referred to as a "QP" (Quantization Parameter)) is calculated on the basis of Equation (9) below on the basis of a block assignment amount and the coding difficulty.

[Math. 9]

$$QP = f(T(k), GPP(k)) \quad (9)$$

Step 4: a function f is updated as shown in Equation (10).

[Math. 10]

$$f(T(k), GPP(k)) \rightarrow f'(T(k), GPP(k)) \quad (10)$$

Thus, in related work 2, since the code amount is assigned depending on a level of coding difficulty of each block image, a larger code amount is assigned to a block image having a high coding difficulty and a smaller code amount is assigned to a block image having a low coding difficulty. Therefore, the image quality is made uniform.

CITATION LIST

Non-Patent Literature

[Non-Patent Literature 1]
Hiroshi Yasuda, Hiroshi Watanabe, "Basics of Digital Image Compression", Nikkei BP Corporation, Jan. 20, 1996, pp 192-195
[Non-Patent Literature 2]
Miaohui Wang, King Ngi Ngan, and Hongliang Li, "An Efficient Frame-Content Based Intra Frame Rate Control for High Efficiency Video Coding," IEEE SIGNAL PROCESSING LETTERS, Vol. 22, No. 7, pp 896-pp 900, July 2015

SUMMARY OF INVENTION

Technical Problem

However, in related work 2 described above, the coding difficulty of each block image is calculated using the pixel value difference, but the coding difficulty of the block image may change depending on the code amount assigned to the coding target picture. Therefore, there is a problem that the code amount to be assigned becomes inappropriate and the code amount control may not be performed correctly.

In view of the above circumstances, an object of the invention is to provide a technology for enabling a more accurate assignment of a code amount while maintaining the image quality of image information that is a coding target uniform.

Solution to Problem

An aspect of the invention is directed to a code amount estimation device including: a code amount estimation unit configured to estimate a first target code amount on the basis of a first code amount estimation area in first image information and a code amount estimation model for estimating the first target code amount for each first code amount estimation area using the first code amount estimation area and multiple first quantization parameters determined in advance, wherein the code amount estimation model is a model generated by associating a second code amount estimation area in second image information, multiple second quantization parameters, and a second target code amount for each second code amount estimation area when coding is performed with respective values of multiple second quantization parameters with each other.

An aspect of the invention is directed to this code amount estimation device, wherein the code amount estimation model performs updating of the association only in a case in which multiple second quantization parameters are at least some of multiple first quantization parameters and the first target code amount is the first target code amount when coding is performed with quantization parameters present in both of multiple first quantization parameters and multiple second quantization parameters among the estimated first target code amounts.

An aspect of the invention is directed to the code amount estimation device, wherein the code amount estimation model is a model for performing a learning process using learning data in which the second code amount estimation area in the second image information, multiple second quantization parameters corresponding to the second code amount estimation area, and relationship information indicating a relationship with complexity are associated with each other.

An aspect of the invention is directed to a code amount estimation method including: a code amount estimation step of estimating a first target code amount on the basis of a first code amount estimation area in first image information, and a code amount estimation model for estimating the first target code amount for each first code amount estimation area using the first code amount estimation area and multiple first quantization parameters determined in advance; and a step of generating the code amount estimation model by performing association of a second code amount estimation area in second image information, multiple second quantization parameters, and a second target code amount for each second code amount estimation area when coding is performed with respective values of multiple second quantization parameters with each other.

An aspect of the invention is directed to a code amount estimation program for causing a computer to execute: a code amount estimation step of estimating a first target code amount on the basis of a first code amount estimation area in first image information, and a code amount estimation model for estimating the first target code amount for each first code amount estimation area using the first code amount estimation area and multiple first quantization parameters determined in advance; and a step of generating the code amount estimation model by performing association of a second code amount estimation area in second image information, multiple second quantization parameters, and a second target code amount for each second code amount estimation area when coding is performed with respective values of multiple second quantization parameters with each other.

Advantageous Effects of Invention

According to the invention, it is possible to enable a more accurate assignment of a code amount while maintaining image quality of image information that is a coding target uniform.

DESCRIPTION OF EMBODIMENTS

First Embodiment

Figure 1:
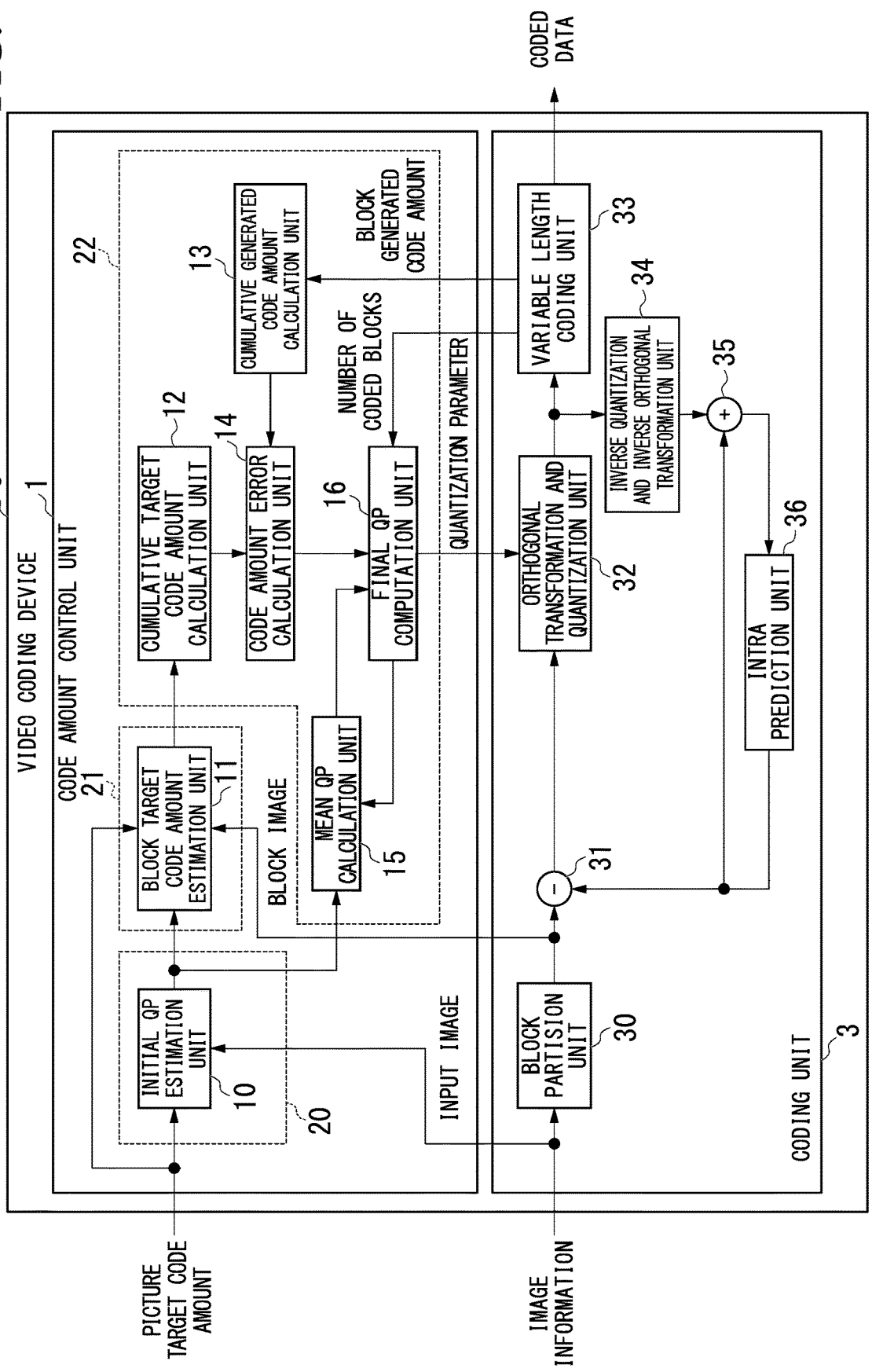
FIG. 1 is a block diagram illustrating a configuration of a video coding device according to a first embodiment of the invention.

Hereinafter, embodiments of the invention will be described with reference to the drawings. FIG. 1 is a block diagram illustrating a configuration of a video coding device C according to a first embodiment. The video coding device C is, for example, a device that conforms to the H.265/High Efficiency Video Coding (HEVC) standard.

The video coding device C includes a code amount control unit 1 and a coding unit 3. The coding unit 3 codes image information that is a coding target according to the QP output from the code amount control unit 1 and outputs coded data. Here, the image information is, for example, still image information. In the following description, the image information is also referred to as a picture.

The coding unit 3 includes a block partition unit 30, a subtractor 31, an orthogonal transformation and quantization unit 32, a variable length coding unit 33, an inverse quantization and inverse orthogonal transformation unit 34, an adder 35, and an intra prediction unit 36. In the coding unit 3, the block partition unit 30 divides the coding target image information provided from the outside to the video coding device C into block image information, and outputs the divided coding target block image information to the block target code amount estimation unit 11 and the subtractor 31.

The subtractor 31 calculates a difference between a pixel value of each pixel of the coding target block image information output by the block partition unit 30 and a pixel value of each pixel of predicted image information output by the intra prediction unit 36 and generates difference block image information. Further, the subtractor 31 outputs the generated difference block image information to the orthogonal transformation and quantization unit 32.

The orthogonal transformation and quantization unit 32 performs orthogonal transformation on the difference block image information output by the subtractor 31, and performs quantization on the orthogonally transformed difference block image information on the basis of the QP output by the final QP calculation unit 16 to generate a quantization coefficient. Further, the orthogonal transformation and quantization unit 32 outputs the generated quantization coefficient to the variable length coding unit 33 and the inverse quantization and inverse orthogonal transformation unit 34.

The variable length coding unit 33 performs variable length coding on the quantization coefficient output by the orthogonal transformation and quantization unit 32 to generate coded data, and outputs the generated coded data to the outside of the video coding device C. Further, the variable length coding unit 33 outputs a generated code amount of the block image information obtained when generating the coded data (hereinafter referred to as "block generated code amount") to the cumulative generated code amount calculation unit 13. Further, the variable length coding unit 33 outputs a value of the number of coded blocks subjected to a coding process in the coding target image information obtained when generating coded data to the final QP calculation unit 16.

The inverse quantization and inverse orthogonal transformation unit 34 performs inverse quantization and inverse orthogonal transformation on the quantization coefficient output by the orthogonal transformation and quantization unit 32 to decode the difference block image information, and outputs the decoded difference block image information to the adder 35.

The adder 35 sums the pixel value of each pixel of the decoded difference block image information output by the inverse quantization and inverse orthogonal transformation unit 34 and the pixel value of each pixel of the predicted image information output by the intra prediction unit 36 to generate reference image information. Further, the adder 35 also outputs the generated reference image information to the intra prediction unit 36.

The intra prediction unit 36 generates predicted image information obtained by intra prediction corresponding to the coding target block image information on the basis of the reference image information output by the adder 35, and outputs the generated predicted image information to the subtractor 31.

The code amount control unit 1 includes a quantization parameter estimation unit 20, a code amount estimation unit 21, and a quantization parameter correction unit 22.

The quantization parameter estimation unit 20 calculates an initial value of the QP. The quantization parameter estimation unit 20 includes an initial QP estimation unit 10. The initial QP estimation unit 10 calculates an initial QP (QPinit) on the basis of the coding target image information and a picture target code amount that is a desired required code amount required for the coding target image information. Here, the picture target code amount that is the desired required code amount is, for example, the number of bits per image information after coding. However, the picture target code amount is not limited to the number of bits per image information and may be a value indicated by the number of bits per pixel, a file size, or the like.

The code amount estimation unit 21 calculates a target code amount for each piece of block image information. The code amount estimation unit 21 includes a block target code amount estimation unit 11. The block target code amount estimation unit 11 calculates a block target code amount that is a target code amount for each coding target block image information on the basis of the initial QP output by the initial QP estimation unit 10, the coding target block image information, and the picture target code amount.

The quantization parameter correction unit 22 corrects the QP. The quantization parameter correction unit 22 includes a cumulative target code amount calculation unit 12, a cumulative generated code amount calculation unit 13, a code amount error calculation unit 14, a mean QP calculation unit 15, and a final QP calculation unit 16. In the quantization parameter correction unit 22, the cumulative target code amount calculation unit 12 calculates a cumulative value of the block target code amount of the coded block image information output by the block target code amount estimation unit 11, that is, a sum of block target code amounts up to immediately before a block image information that is coding target.

The cumulative generated code amount calculation unit 13 calculates a cumulative value of the block generated code amount of the coded block image information output by the variable length coding unit 33, that is, a sum of block generated code amounts up to immediately before a block image information that is a coding target. The code amount error calculation unit 14 calculates a difference between the cumulative value of the block target code amount output by the cumulative target code amount calculation unit 12 and the cumulative value of the block generated code amount output by the cumulative generated code amount calculation unit 13 and outputs the difference as a code amount error.

The mean QP calculation unit 15 sets the initial QP output by the initial QP estimation unit 10 as an initial value and calculates a mean QP that is a mean value of the QP up to immediately before the block image information that is a coding target. Here, the mean value of the QP up to immediately before the block image information that is a coding target is a value obtained by dividing a sum of the QPs up to immediately before the block image information that is a coding target by the number of the QPs.

The final QP calculation unit 16 calculates a QP to be applied to the block image information that is a coding target on the basis of the code amount error calculated by the code amount error calculation unit 14, the mean QP output by the mean QP calculation unit 15, and the value of the number of coded blocks in the coding target image information output by the variable length coding unit 33.

Figure 2:
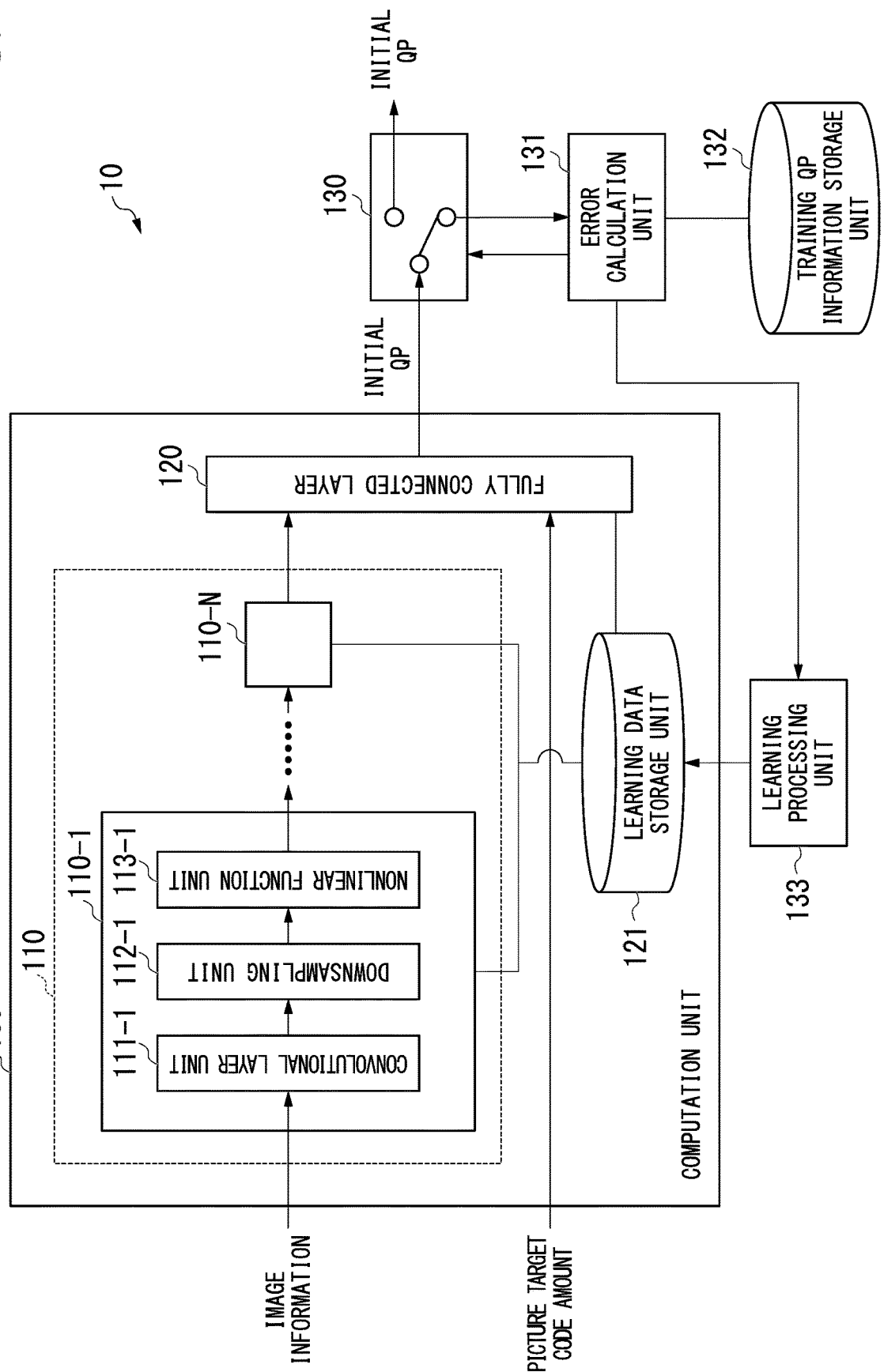
FIG. 2 is a block diagram illustrating a configuration of an initial QP estimation unit of the embodiment.

FIG. 2 is a block diagram illustrating an internal configuration of the initial QP estimation unit 10. The initial QP estimation unit 10, for example, estimates a relationship between the image information, the picture target code amount, and the initial QP through a learning process according to a machine learning model, and generates relationship information indicating the estimated relationship as learned data.

The initial QP estimation unit 10 calculates the initial QP from the coding target image information and a desired picture target code amount Btarget required for the coding target image information using the generated relationship information at the time of an operation of the coding process.

The initial QP estimation unit 10 includes a computation unit 100, a switching unit 130, an error calculation unit 131, a training QP information storage unit 132, and a learning processing unit 133. The computation unit 100 includes a feature extraction unit 110, a fully connected layer 120, and a learning data storage unit 121.

The learning data storage unit 121 stores learning data such as weighting factors between input and output nodes of the fully connected layer 120 and filter coefficients that are used at the time of computation of convolutional layer units 111-1 to 111-N in the feature extraction unit 110.

The feature extraction unit 110 includes feature extraction units 110-1 to 110-N. The feature extraction unit 110-1 includes a convolutional layer unit 111-1, a downsampling unit 112-1, and a nonlinear function unit 113-1. The feature extraction units 110-2 to 110-N have the same internal configuration as that of the feature extraction unit 110-1, and include convolutional layer units 111-2 to 111-N, downsampling units 112-2 to 112-N, and nonlinear function units 113-2 to 113-N, respectively.

The convolutional layer units 111-1 to 111-N apply the filter coefficient stored in the learning data storage unit 121 to input information to perform convolutional computation. The downsampling units 112-1 to 112-N perform downsampling on information output by the corresponding convolutional layer units 111-1 to 111-N. The nonlinear function units 113-1 to 113-N perform a nonlinear function process on information output by the corresponding down-sampling units 112-1 to 112-N.

That is, the feature extraction unit 110 repeats the convolution computation, the downsampling, and the nonlinear function process for the image information N times to calculate a feature amount of the image information. A value of N is an integer equal to or greater than 1.

The fully connected layer 120 includes one output node and multiple input nodes, and fully couples the input node that captures the feature amount output by the feature extraction unit 110 and the input node to which the picture target code amount is provided, to the output node. Further, the fully connected layer 120 performs a computation for multiplying the feature amount output by the feature extraction unit 110 and the picture target code amount by the weighting factor stored in the learning data storage unit 121, and outputs an output value based on the computation result.

The switching unit 130 includes a switch, connects the output terminal of the fully connected layer 120 to a terminal connected to the error calculation unit 131 when the learning process is performed, and connects the output terminal of the fully connected layer 120 to a terminal connected to the block target code amount estimation unit 11 when the coding process is operated.

The training QP information storage unit 132 stores QP information as training information in advance. The error calculation unit 131 calculates an error between the output value of the fully connected layer 120 output by the switching unit 130 and the training information stored in the training QP information storage unit 132. Further, when the calculated error becomes equal to or smaller than a predetermined threshold value, the error calculation unit 131 outputs instruction information to the switching unit 130 so that the switch is switched and the output terminal of the fully connected layer 120 is connected to the terminal connected to the block target code amount estimation unit 11.

The learning processing unit 133 calculates new learning data so that the error is reduced on the basis of the error calculated by the error calculation unit 131, and updates the learning data stored in the learning data storage unit 121 with the calculated learning data through rewriting. As a calculation scheme for reducing the error, for example, an error back propagation method or the like is applied.

Figure 3:
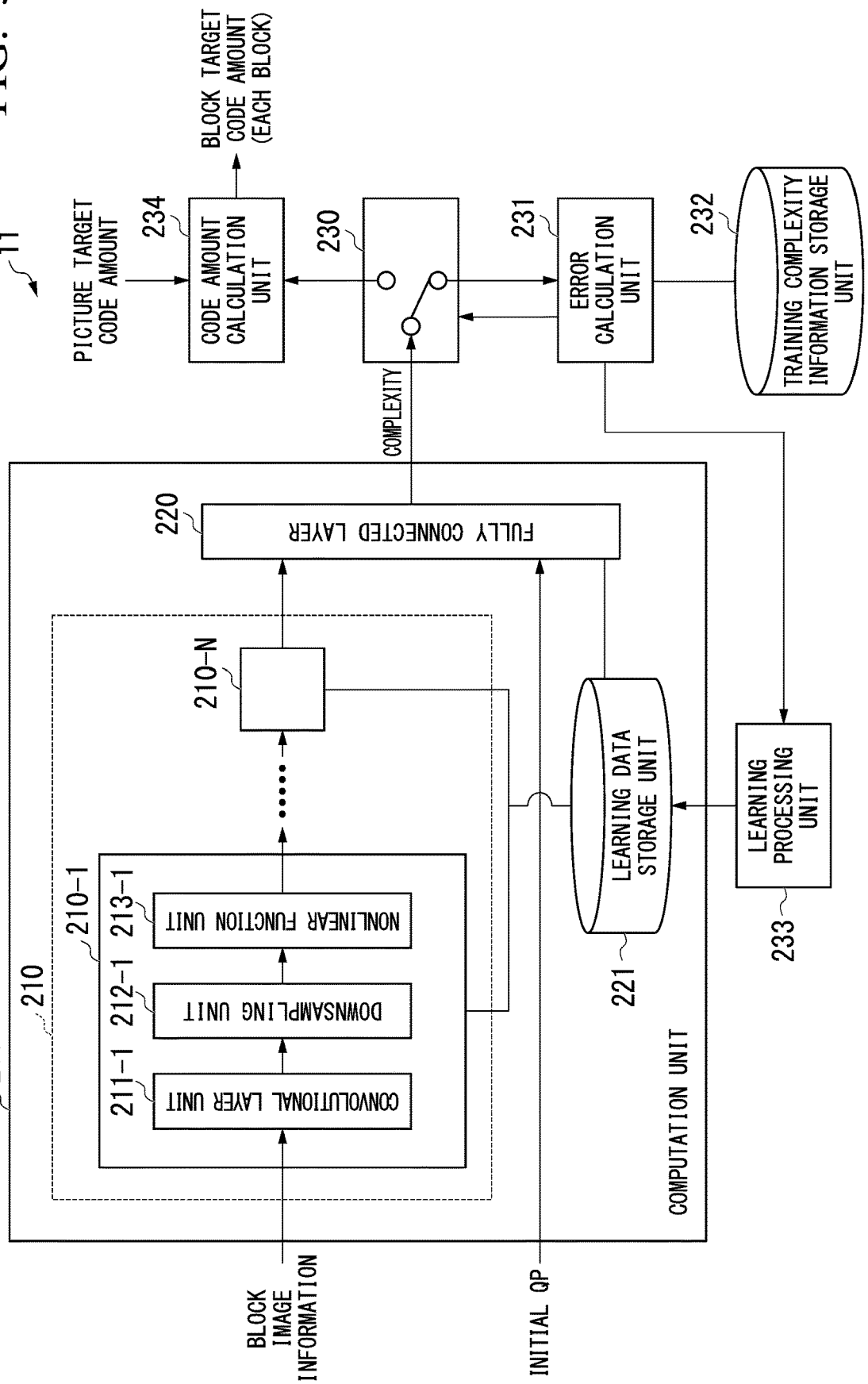
FIG. 3 is a block diagram illustrating a configuration of a block target code amount estimation unit of the embodiment.

FIG. 3 is a block diagram illustrating an internal configuration of the block target code amount estimation unit 11. The block target code amount estimation unit 11 estimates a relationship between the block image information, the initial QP, and the complexity that is an index indicating the complexity of the block image information through a learning process according to a machine learning model, and generates information indicating the estimated relationship as a learned model. Here, the complexity refers to a block generated code amount that is generated when the block image information is coded with the initial QP.

The block target code amount estimation unit 11 calculates the block target code amount on the basis of the coding target block image information, the initial QP output by the initial QP estimation unit 10, and the picture target code amount of the coding target image information including the coding target block image information using the generated relationship information when the coding process is operated.

The block target code amount estimation unit 11 includes a computation unit 200, a switching unit 230, an error calculation unit 231, a training complexity information storage unit 232, a learning processing unit 233, and a code amount calculation unit 234. The computation unit 200 includes a feature extraction unit 210, a fully connected layer 220, and a learning data storage unit 221.

The learning data storage unit 221 stores learning data such as weighting factors between input and output nodes of the fully connected layer 220 and filter coefficients that are used at the time of computation of convolutional layer units 211-1 to 211-N in the feature extraction unit 210.

The feature extraction unit 210 includes feature extraction units 210-1 to 210-N. The feature extraction unit 210-1 includes a convolutional layer unit 211-1, a downsampling unit 212-1, and a nonlinear function unit 213-1. The feature extraction units 210-2 to 210-N have the same internal configuration as that of the feature extraction unit 210-1, and include convolutional layer units 211-2 to 211-N, downsampling units 212-2 to 212-N, and nonlinear function units 213-2 to 213-N, respectively.

The convolutional layer units 211-1 to 211-N apply the filter coefficient stored in the learning data storage unit 221 to input information to perform convolutional computation. The downsampling units 212-1 to 212-N perform downsampling on information output by the corresponding convolutional layer units 211-1 to 211-N. The nonlinear function units 213-1 to 213-N perform a nonlinear function process on information output by the corresponding down-sampling units 212-1 to 212-N.

That is, the feature extraction unit 210 repeats the convolution computation, the downsampling, and the nonlinear function process for the block image information provided from the block partition unit 30 N times to calculate a feature amount of the block image information. A value of N is an integer equal to or greater than 1.

The fully connected layer 220 includes one output node and multiple input nodes, and fully couples the input node that captures the feature amount output by the feature extraction unit 210 and the input node to which the initial QP is provided, to the output node. Further, the fully connected layer 220 performs a computation for multiplying the feature amount output by the feature extraction unit 210 and the initial QP by the weighting factor stored in the learning data storage unit 221, and outputs an output value based on the computation result.

The code amount calculation unit 234 sets the output value output by the fully connected layer 220 as a complexity X(j) of the block image information, and calculates a target code amount T(j) of the block image information on the basis of the complexity X(j) and the picture target code amount Btarget using Equation (11) below.

[Math. 11]

$$T(j) = B_{target} \times X(j) / \sum_{i=1}^{Blk\_cnt} X(i) \tag{11}$$

In Equation (11), Blk_cnt is the number of blocks included in the image information including the block image information that is a target, that is, the number of divisions. Further, the code amount calculation unit 234 outputs a calculated block target code amount T(j) to the cumulative target code amount calculation unit 12.

The switching unit 230 includes a switch, connects the output terminal of the fully connected layer 220 to a terminal connected to the error calculation unit 231 when the learning process is performed, and connects the output of the fully connected layer 220 to a terminal connected to the code amount calculation unit 234 when the coding process is operated.

The training complexity information storage unit 232 stores a complexity as the training information in advance. The error calculation unit 231 calculates an error between the output value of the fully connected layer 220 output by the switching unit 230 and the training information stored in the training complexity information storage unit 232. Further, when the calculated error becomes equal to or smaller than the predetermined threshold value, the error calculation unit 231 outputs instruction information to the switching unit 230 so that the switch is switched and the output terminal of the fully connected layer 220 is connected to the terminal connected to the code amount calculation unit 234.

The learning processing unit 233 calculates new learning data so that the error is reduced on the basis of the error calculated by the error calculation unit 231, and updates the learning data stored in the learning data storage unit 221 with the calculated learning data through re-writing. As a calculation scheme for reducing the error, for example, an error back propagation method or the like is applied.

(QP Calculation Process in First Embodiment)

Figure 4:
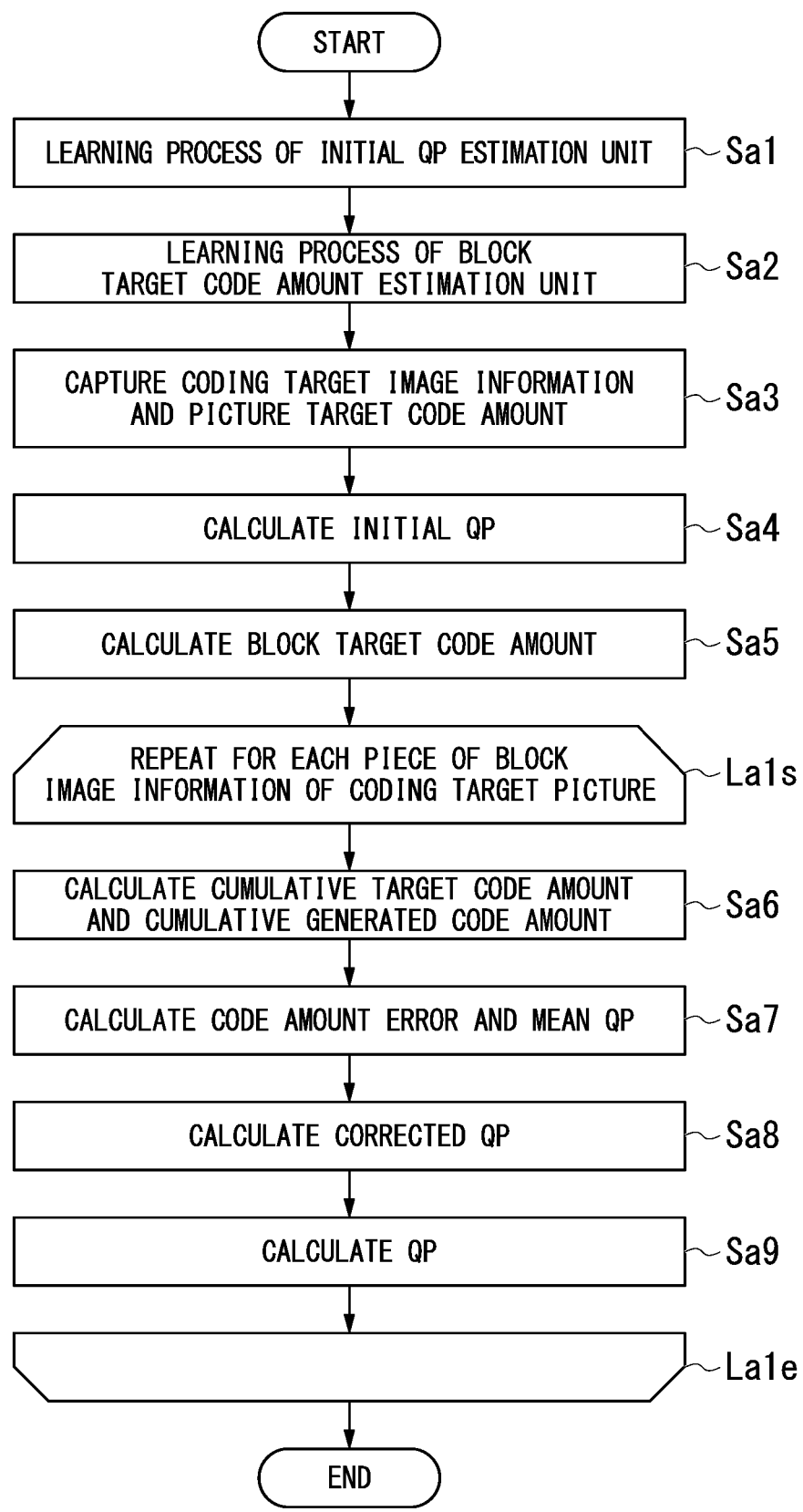
FIG. 4 is a flowchart illustrating a flow of a process in a code amount control unit of the embodiment.

Next, a QP calculation process in the code amount control unit 1 will be described. FIG. 4 is a flowchart illustrating a flow of the QP calculation process. The process illustrated in FIG. 4 is divided into a learning process and a coding process. After the learning process in steps Sa1 to Sa2 is completed and learned data is generated, the video coding device C in a process from step Sa3 captures coding target video information and performs the coding process. The initial QP estimation unit 10 generates relationship information indicating a relationship between the image information, the picture target code amount corresponding to the image information, and the initial QP through the learning process (step Sa1).

In order to cause the initial QP estimation unit 10 to perform the learning process for generating the learned data, that is, the relationship information, information in which probability distribution information of the image information for learning and probability distribution information of the picture target code amount are associated is prepared as the input information in advance. Further, when the image information is coded, probability distribution information of the QP that is closest to the corresponding picture target code amount is prepared as the training information.

The probability distribution information of the QP is stored as the training information in the training QP information storage unit 132, and the switch of the switching unit 130 is switched so that the output terminal of the fully connected layer 120 is connected to the terminal connected to the error calculation unit 131 in advance. The feature extraction unit 110 captures the probability distribution information of the image information for learning, and the fully connected layer 120 captures probability distribution information of a picture target code amount for learning, so that the initial QP estimation unit 10 starts the learning process.

When the error calculated by the error calculation unit 131 is, for example, equal to or smaller than the predetermined threshold value, the learning process ends, and the error calculation unit 131 outputs the instruction information to the switching unit 130. The switching unit 130 receives the instruction information, switches the switch, and sets the connection destination of the output terminal of the fully connected layer 120 to the block target code amount estimation unit 11. At this timing, the learned data stored in the learning data storage unit 121 becomes the relationship information indicating the relationship between the block image information, the picture target code amount, and the initial QP described above.

The block target code amount estimation unit 11 generates relationship information indicating a relationship between the block image information, the initial QP corresponding to the block image information, and the complexity through the learning process (step Sa2).

In order to cause the block target code amount estimation unit 11 to perform the learning process for generating the learned data, that is, the relationship information, information in which probability distribution information of the block image information for learning and probability distribution information of the initial QP are associated is prepared as input information in advance. Further, probability distribution information of the complexity that is generated when the block image information is coded using the corresponding initial QP is prepared as the training information.

The probability distribution information of the complexity is stored as training information in the training complexity information storage unit 232, and the switch of the switching unit 230 is switched so that the output terminal of the fully connected layer 220 is connected to the terminal connected to the error calculation unit 231 in advance. The feature extraction unit 210 captures the probability distribution information of the image information for learning, and the fully connected layer 220 captures probability distribution information of an initial QP for learning, so that the block target code amount estimation unit 11 starts the learning process.

When the error calculated by the error calculation unit 231 is, for example, equal to or smaller than the predetermined threshold value, the learning process ends, and the error calculation unit 231 outputs the instruction information to the switching unit 230. The switching unit 230 receives the instruction information, switches the switch, and sets the connection destination of the output terminal of the fully connected layer 220 to the code amount calculation unit 234. At this timing, the learned data stored in the learning data storage unit 221 becomes relationship information indicating a relationship between the block image information, the initial QP, and the complexity described above.

The video coding device C captures the coding target image information and a desired picture target code amount required for the coding target image information (step Sa3). The computation unit 100 of the initial QP estimation unit 10 of the code amount control unit 1 captures the coding target image information and the picture target code amount. The feature extraction unit 110 calculates a feature amount of the captured coding target image information using the learned data stored in the learning data storage unit 121.

The fully connected layer 120 calculates the initial QP on the basis of the feature amount output by the feature extraction unit 110, the picture target code amount, and the learned data stored in the learning data storage unit 121. The initial QP estimation unit 10 outputs the calculated initial QP to the block target code amount estimation unit 11 (step Sa4).

The block target code amount estimation unit 11 captures the coding target block image information output by the block partition unit 30 and the initial QP output by the initial QP estimation unit 10. The computation unit 200 of the block target code amount estimation unit 11 captures the coding target block image information and the initial QP. The feature extraction unit 210 calculates the feature amount of the captured coding target block image information using the learned data stored in the learning data storage unit 221.

The fully connected layer 220 calculates the block target code amount on the basis of the feature amount output by the feature extraction unit 210, the initial QP, and the learned data stored in the learning data storage unit 221. The block target code amount estimation unit 11 outputs the calculated block target code amount to the cumulative target code amount calculation unit 12 (step Sa5).

Hereinafter, the quantization parameter correction unit 22 repeatedly performs the processes from step Sa6 to step Sa9 on each piece of block image information of the coding target image information (loops La1s to La1e). The cumulative target code amount calculation unit 12 calculates a cumulative target code amount Tsum, which is a cumulative value of the block target code amounts up to the block image information immediately before the block image information that is a coding target in the coding unit 3.

The cumulative generated code amount calculation unit 13 calculates a cumulative generated code amount Bsum that is a cumulative value of the block generated code amount up to the block image information immediately before the block image information that is a coding target in the coding unit 3 among the block generated code amounts output by the variable length coding unit 33 (step Sa6). The cumulative target code amount Tsum is expressed using Equation (12) below, and the cumulative generated code amount Bsum is expressed using Equation (13) below.

[Math. 12]
$$T_{sum} = \sum_{i=1}^{j-1} T(i) \quad (12)$$

[Math. 13]
$$B_{sum} = \sum_{i=1}^{j-1} B(i) \quad (13)$$

In Equation (13), B(i) is the block generated code amount of the i-th block image information.

The code amount error calculation unit 14 calculates a code amount error D using Equation (14) below on the basis of the cumulative generated code amount Bsum output by the cumulative generated code amount calculation unit 13 and the cumulative target code amount Tsum output by the cumulative target code amount calculation unit 12, and outputs the code amount error D to the final QP calculation unit 16.

[Math. 14]

$$D = B_{sum} - T_{sum} \quad (14)$$

The mean QP calculation unit 15 captures the QP for each piece of block image information output by the final QP calculation unit 16, and calculates a mean QP (QPmean) that is a mean value of the QP up to the block image information immediately before the block image information that is a coding target in the coding unit 3 on the basis of Equation (15) below (step Sa7).

[Math. 15]

$$QP_{mean} = \sum_{i=1}^{j-1} QP(i)/(j-1) \quad (15)$$

The final QP calculation unit 16 calculates a corrected QP that is a correction value of the QP as deltaQP using Equation (16) below (step Sa8).

[Math. 16]

$$\text{deltaQP} = \text{deltaQP}_{org} + \text{deltaQP}_{org}/\text{BlkProc\_cnt} \quad (16)$$

In Equation (16), BlkProc_cnt denotes the number of coded blocks in the coding target image information output by the variable length coding unit 33. Further, deltaQPorg denotes a value obtained from the code amount error D calculated by the code amount error calculation unit 14 on the basis of Equation (17) below, and k denotes an adjustment parameter coefficient.

[Math. 17]

$$\text{deltaQP}_{org} = k \times D \quad (17)$$

The final QP calculation unit 16 calculates the final QP on the basis of the mean QP (QPmean) output by the mean QP calculation unit 15 and the calculated corrected QP (deltaQP) using Equation (18) below, and outputs the final QP to the orthogonal transformation and quantization unit 32 (step Sa9).

[Math. 18]

$$QP = \text{Round}(QP_{mean} + \text{deltaQP}) \quad (18)$$

A Round( ) function in Equation (18) means a function that performs rounding computation such as rounding up, rounding down, and rounding off. The coding unit 3 performs coding of each piece of block image information using the QP output for each piece of block image information by the code amount control unit 1, and repeats the process until the coding of all pieces of block image information ends.

With the configuration of the first embodiment, the quantization parameter estimation unit 20 estimates the initial QP to be applied to the image information on the basis of the image information and the desired picture target code amount required in coding. The code amount estimation unit 21 estimates the block target code amount for each piece of block image information on the basis of the initial QP and the block image information obtained by dividing the image information into blocks.

That is, in the configuration of the first embodiment, when the block target code amount to be assigned to each piece of block image information is calculated, the initial QP estimation unit 10 estimates the relationship between the image information, the picture target code amount corresponding to the image information, and the initial QP through the learning process using the machine learning model, and generates the learned data obtained through the learning process as the relationship information indicating the relationship in advance. Further, the block target code amount estimation unit 11 estimates the relationship between the block image information, the initial QP, and the complexity through the learning process using the machine learning model, and generates the learned data obtained through the learning process as the relationship information indicating the relationship in advance.

The initial QP estimation unit 10 calculates the initial QP from the coding target image information and a desired picture target code amount required for the coding target image information using the generated relationship information. The block target code amount estimation unit 11 calculates the block target code amount from the coding target block image information and the initial QP using the generated relationship information. Therefore, it becomes possible to calculate the block target code amount according to the feature of the coding target image information and the desired picture target code amount, and to assign an appropriate QP to each piece of block image information. Thereby, it becomes possible to perform assignment of a more accurate code amount obtained by setting a desired code amount, for example, a desired file size while maintaining the image quality of the image information that is a coding target uniform.

Figure 5:
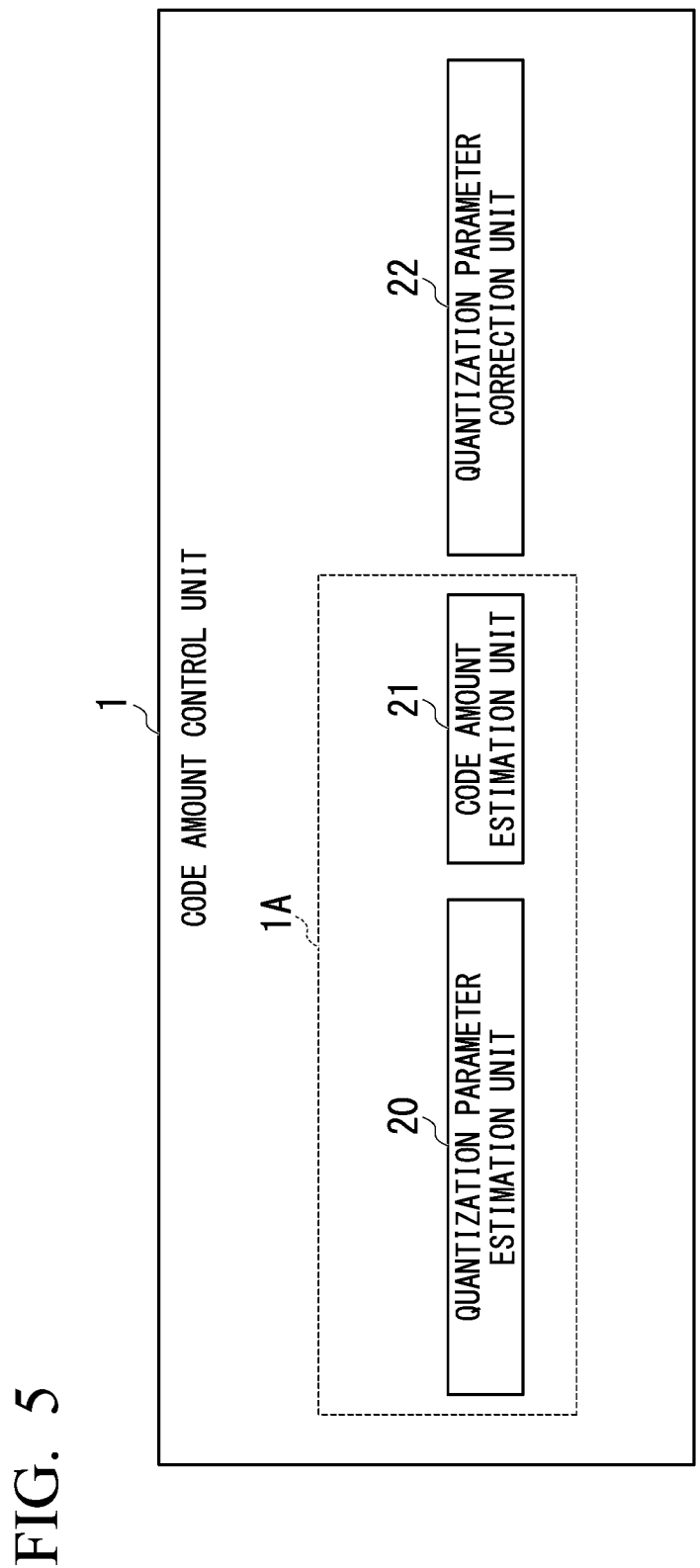
FIG. 5 is a diagram illustrating another configuration example of the code amount control unit in the embodiment.

In the code amount control unit 1 of the first embodiment, the quantization parameter estimation unit 20 and the code amount estimation unit 21 are configured as one code amount estimation device 1A, as illustrated in FIG. 5.

Second Embodiment

Figure 6:
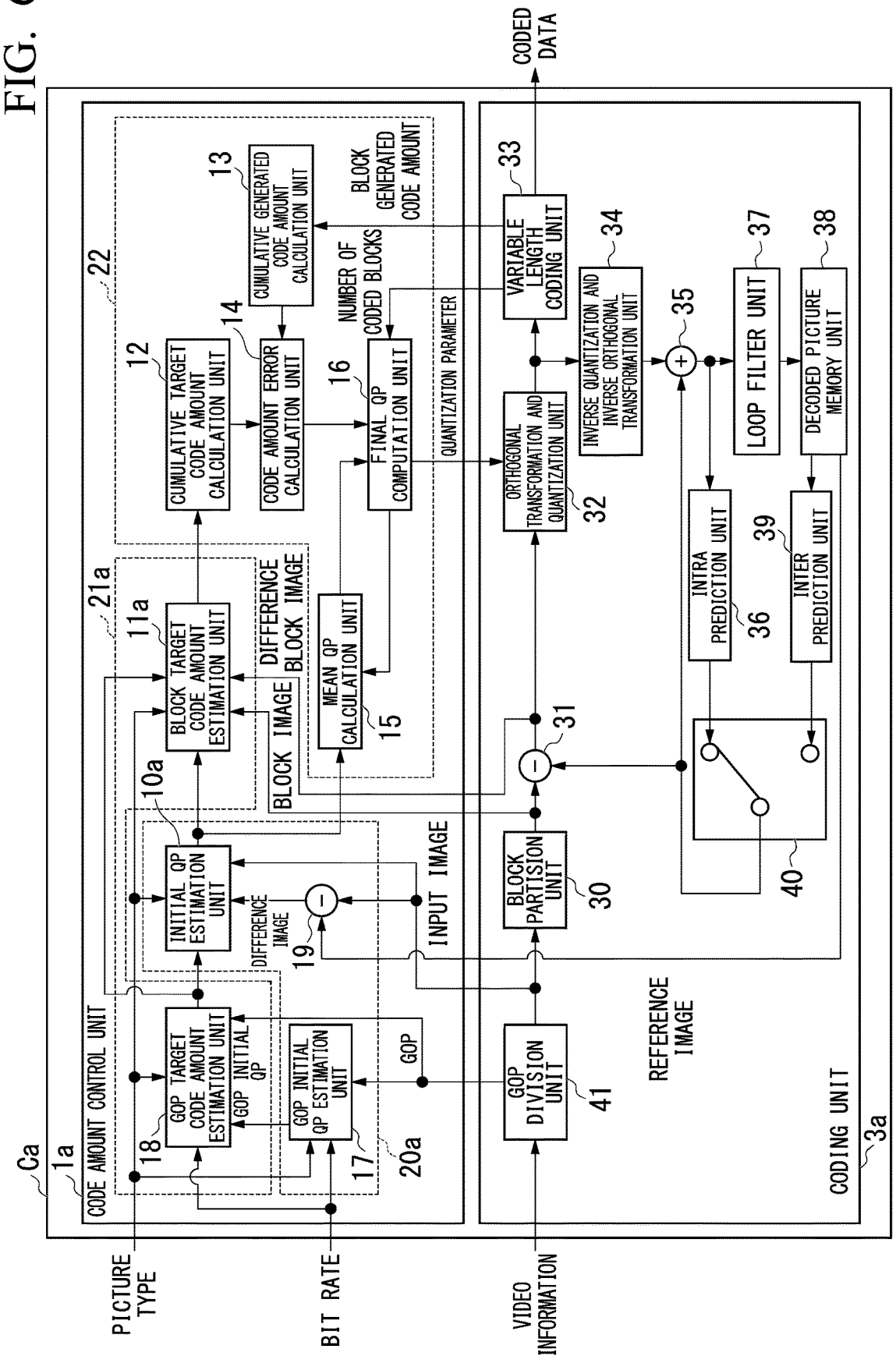
FIG. 6 is a block diagram illustrating a configuration of a video coding device according to a second embodiment.

FIG. 6 is a block diagram illustrating a configuration of a video coding device Ca according to a second embodiment. In the video coding device Ca according to the second embodiment, components the same as those of the video coding device C of the first embodiment are denoted by the same reference signs, and different configurations will be hereinafter described. The video coding device Ca includes a code amount control unit 1a and a coding unit 3a. The coding unit 3a performs coding of video information that is a coding target according to a QP output by the code amount control unit 1a and outputs coded data.

The coding unit 3a includes a group of pictures (GOP) division unit 41, a block partition unit 30, a subtractor 31, an orthogonal transformation and quantization unit 32, a variable length coding unit 33, an inverse quantization and inverse orthogonal transformation unit 34, an adder 35, an intra prediction unit 36, a loop filter unit 37, a decoded picture memory unit 38, an inter prediction unit 39, and an intra and inter changeover switch unit 40.

In the coding unit 3a, the GOP division unit 41 divides multiple pieces of consecutive image information included in the video information into a predetermined number of pieces of image information according to predetermined conditions. Further, the GOP division unit 41 outputs a set of multiple pieces of divided image information as GOP to a GOP initial QP estimation unit 17 and a GOP target code amount estimation unit 18. Further, the GOP division unit 41 outputs each piece of image information included in the GOP to the block partition unit 30, the subtractor 19, and the initial QP estimation unit 10a in a coding order.

The subtractor 31 calculates a difference between a pixel value of each pixel of the coding target block image information output by the block partition unit 30 and a pixel value of each pixel of the predicted image information output by the intra prediction unit 36 or the inter prediction unit 39, and generates difference block image information. Further, the subtractor 31 outputs the generated difference block image information to a block target code amount estimation unit 11a and an orthogonal transformation and quantization unit 32.

The adder 35 sums the pixel value of each pixel of the decoded difference block image information output by the inverse quantization and inverse orthogonal transformation unit 34 and the pixel value of each pixel of the predicted image information output by the intra prediction unit 36 or the inter prediction unit 39 to generate reference image information. Further, the adder 35 outputs the generated reference image information to the intra prediction unit 36 and the loop filter unit 37.

The loop filter unit 37 applies a loop filter to the reference image information output by the adder 35 to generate reference image information for inter prediction, and writes and stores the generated reference image information for inter prediction to and in the decoded picture memory unit 38. The decoded picture memory unit 38 is a storage device such as a writable random access memory (RAM) and stores reference image information for inter prediction written by the loop filter unit 37.

The inter prediction unit 39 generates predicted image information through inter prediction of the coding target block image information using the reference image information for inter prediction stored in the decoded picture memory unit 38.

The intra and inter changeover switch unit 40 switches the switch according to a prediction mode of the coding target block image information, and connects the subtractor 31 and the adder 35 to any one of the intra prediction unit 36 and the inter prediction unit 39.

The code amount control unit 1a includes a quantization parameter estimation unit 20a, a code amount estimation unit 21a, and a quantization parameter correction unit 22. In the code amount control unit 1a, the quantization parameter estimation unit 20a includes a GOP initial QP estimation unit 17, a subtractor 19, and an initial QP estimation unit 10a.

In the quantization parameter estimation unit 20a, the GOP initial QP estimation unit 17 calculates the GOP initial QP on the basis of the GOP output by the GOP division unit 41, a bit rate that is a desired required code amount required for the GOP, and a picture type list that is a list of picture types of the image information included in the GOP. Here, the GOP initial QP is a value of the initial QP calculated for each GOP, and the GOP initial QP calculated for one certain GOP is a value commonly applied to the pieces of image information included in the GOP.

The subtractor 19 calculates a difference between the pixel value of each pixel of the image information output by the GOP division unit 41 and the pixel value of each pixel of the reference image information stored in the decoded picture memory unit 38 to generate the difference image information, and outputs the generated difference image information to the initial QP estimation unit 10a.

The initial QP estimation unit 10a calculates the initial QP on the basis of input image information that is any one of the difference image information output by the subtractor 19 and the image information output by the GOP division unit 41, a picture type corresponding to the input image information, and the picture target code amount corresponding to the input image information output by the GOP target code amount estimation unit 18.

The code amount estimation unit 21a includes a GOP target code amount estimation unit 18 and a block target code amount estimation unit 11a. In the code amount estimation unit 21a, the GOP target code amount estimation unit 18 calculates the picture target code amount for each piece of image information included in the GOP on the basis of the GOP output by the GOP division unit 41, the GOP initial QP output by the GOP initial QP estimation unit 17, the picture type list that is a list of picture types of image information included in the GOP, and the bit rate.

The block target code amount estimation unit 11a calculates the block target code amount for each coding target block image information on the basis of input block image information, which is any one of the difference block image information output by the subtractor 31 and the block image information output by the block partition unit 30, the picture type corresponding to the input block image information, and the initial QP output by the initial QP estimation unit 10a.

Figure 7:
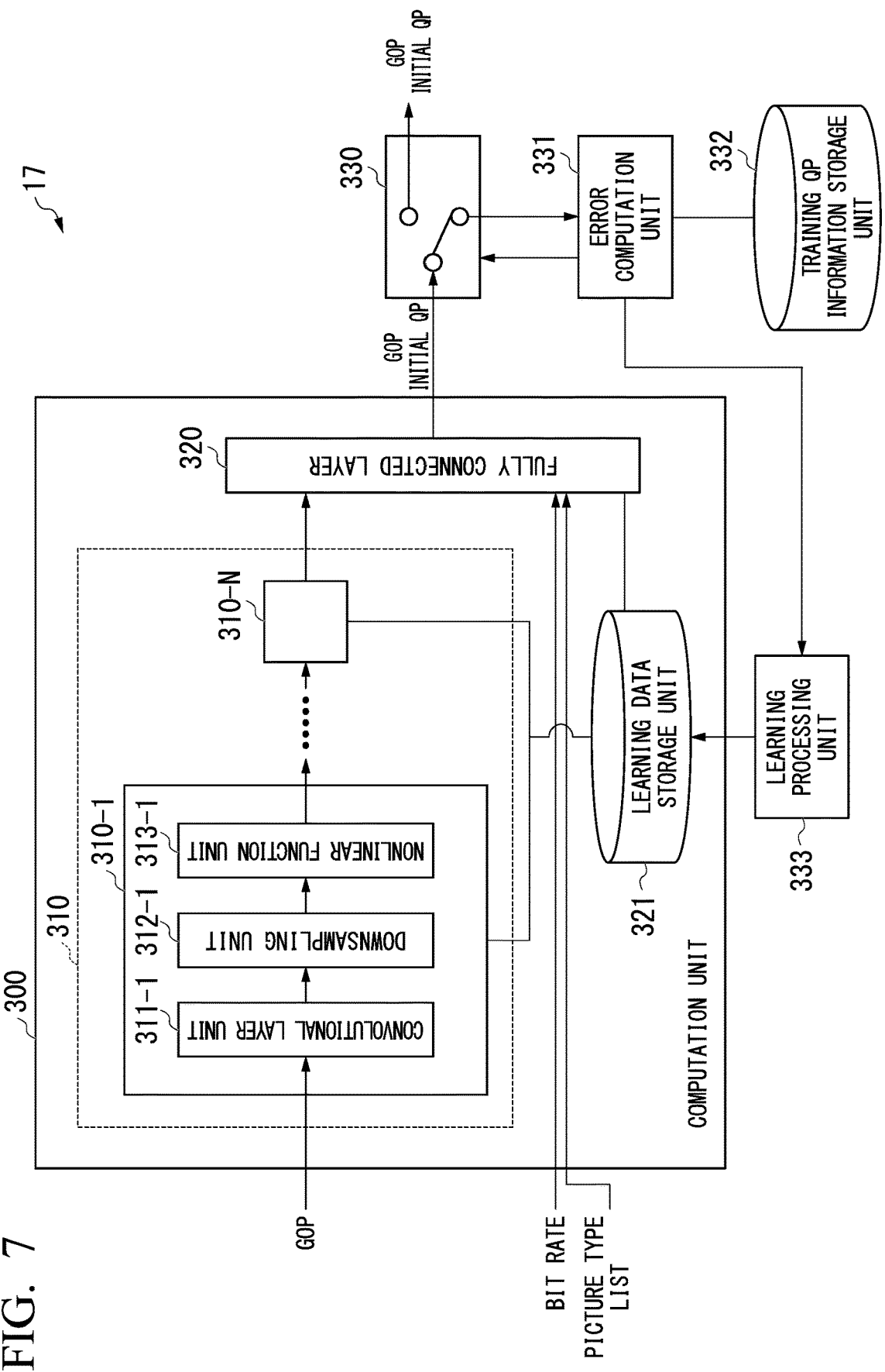
FIG. 7 is a block diagram illustrating a configuration of a GOP initial QP estimation unit of the embodiment.

FIG. 7 is a block diagram illustrating an internal configuration of the GOP initial QP estimation unit 17. The GOP initial QP estimation unit 17, for example, estimates a relationship between multiple pieces of image information forming the GOP, the picture type list that is a list of picture types of image information included in the GOP, the bit rate, and the GOP initial QP through the learning process according to the machine learning model, and generates relationship information indicating the estimated relationship as the learned data.

The GOP initial QP estimation unit 17 calculates the GOP initial QP (QPGO Pinit) on the basis of the GOP of the coding target output by the GOP division unit 41, the picture type list that is a list of picture types of the image information included in the GOP of the coding target, and a desired bit rate required for the GOP of the coding target using the generated relationship information at the time of an operation of the coding process.

The GOP initial QP estimation unit 17 includes a computation unit 300, a switching unit 330, an error calculation unit 331, a training QP information storage unit 332, and a learning processing unit 333. The computation unit 300 includes a GOP feature extraction unit 310, a fully connected layer 320, and a learning data storage unit 321.

The learning data storage unit 321 stores learning data such as weighting factors between input and output nodes of the fully connected layer 320 and the filter coefficients that are used at the time of computation of convolutional layer units 311-1 to 311-N in the feature extraction unit 310.

The GOP feature extraction unit 310 includes GOP feature extraction units 310-1 to 310-N. The GOP feature extraction unit 310-1 includes a convolutional layer unit 311-1, a downsampling unit 312-1, and a nonlinear function unit 313-1. The GOP feature extraction units 310-2 to 310-N have the same internal configuration as that of the GOP feature extraction unit 310-1, and include convolutional layer units 311-2 to 311-N, downsampling unit 312-2 to 312-N, and nonlinear function units 313-2 to 313-N, respectively.

The convolutional layer units 311-1 to 311-N apply the filter coefficient stored in the learning data storage unit 321 to input information to perform convolutional computation. The downsampling units 312-1 to 312-N perform downsampling on information output by the corresponding convolutional layer units 311-1 to 311-N. The nonlinear function units 313-1 to 313-N perform a nonlinear function process on information output by the corresponding down-sampling units 312-1 to 312-N.

That is, the GOP feature extraction unit 310 regards each piece of image information included in the GOP as a channel, captures the image information, and repeats the convolution computation, the downsampling, and the nonlinear function process on each channel N times to calculate a feature amount of the GOP. A value of N is an integer equal to or greater than 1.

The fully connected layer 320 includes one output node and multiple input nodes, and fully couples the input node that captures the feature amount output by the GOP feature extraction unit 310, the input node to which a bit rate is provided, and the input node to which a picture type list that is a list of picture types of respective pieces of image information included in the GOP is provided, to the output node.

Further, the fully connected layer 320 performs a computation for multiplying the feature amount output by the GOP feature extraction unit 310, the bit rate, and the picture type list by the weighting factor stored in the learning data storage unit 321, and outputs an output value based on the computation result.

The switching unit 330 includes a switch, connects the output terminal of the fully connected layer 320 to a terminal connected to the error calculation unit 331 when the learning process is performed, and connects the output of the fully connected layer 320 to a terminal connected to the GOP target code amount estimation unit 18 when the coding process is operated.

The training QP information storage unit 332 stores QP information as training information in advance. The error calculation unit 331 calculates an error between the output value of the fully connected layer 320 output by the switching unit 330 and the training information stored in the training QP information storage unit 332. Further, when the calculated error becomes equal to or smaller than a predetermined threshold value, the error calculation unit 331 outputs instruction information to the switching unit 330 so that the switch is switched and the output terminal of the fully connected layer 320 is connected to the terminal connected to the GOP target code amount estimation unit 18.

The learning processing unit 333 calculates new learning data so that the error is reduced on the basis of the error calculated by the error calculation unit 331, and updates the learning data stored in the learning data storage unit 321 with the calculated learning data through rewriting. As a calculation scheme for reducing the error, for example, an error back propagation method or the like is applied.

Figure 8:
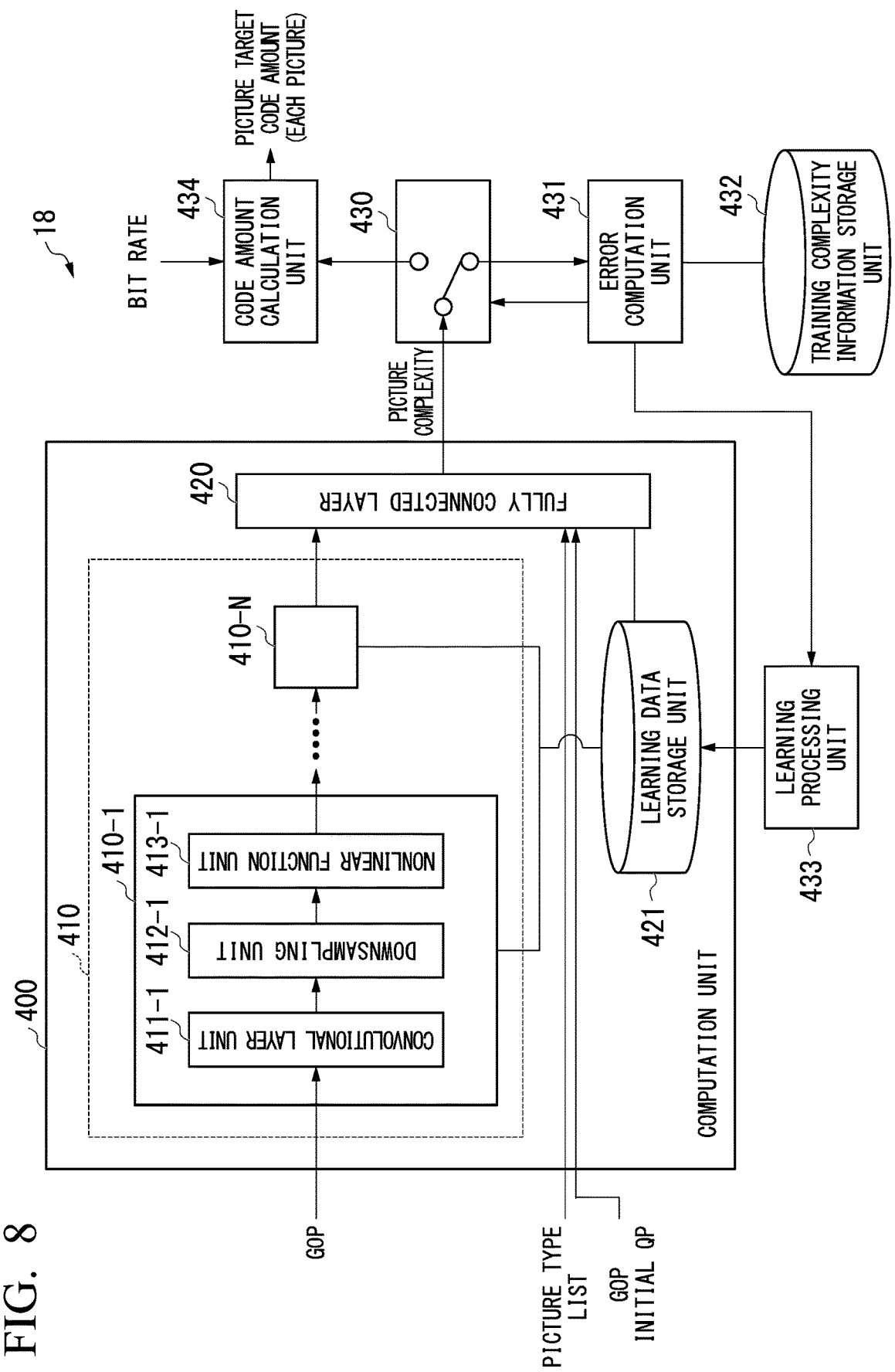
FIG. 8 is a block diagram illustrating a configuration of a GOP target code amount estimation unit of the embodiment.

FIG. 8 is a block diagram illustrating an internal configuration of the GOP target code amount estimation unit 18. The GOP target code amount estimation unit 18, for example, estimates a relationship between multiple pieces of image information forming the GOP, the picture type list that is a list of picture types of image information included in the GOP, the GOP initial QP, and the picture complexity through the learning process according to a machine learning model, and generates information indicating the estimated relationship as a learned model. Here, the picture complexity is a generated code amount generated when each piece of image information included in the GOP is coded with the GOP initial QP.

The GOP target code amount estimation unit 18 calculates the picture target code amount for each piece of image information included in the GOP on the basis of the GOP of the coding target output by the GOP division unit 41, the picture type list that is a list of picture types of the image information included in the GOP of the coding target, the GOP initial QP output by the GOP initial QP estimation unit 17, and a desired bit rate required for the GOP of the coding target using the generated relationship information at the time of an operation of the coding process.

The GOP target code amount estimation unit 18 includes a computation unit 400, a switching unit 430, an error calculation unit 431, a training complexity information storage unit 432, a learning processing unit 433, and a code amount calculation unit 434. The computation unit 400 includes a GOP feature extraction unit 410, a fully connected layer 420, and a GOP learning data storage unit 421.

The learning data storage unit 421 stores learning data such as weighting factors between input and output nodes of the fully connected layer 420 and the filter coefficients that are used at the time of computation of convolutional layer units 411-1 to 411-N in the GOP feature extraction unit 410.

The GOP feature extraction unit 410 includes GOP feature extraction units 410-1 to 410-N. The GOP feature extraction unit 410-1 includes a convolutional layer unit 411-1, a downsampling unit 412-1, and a nonlinear function unit 413-1. The GOP feature extraction units 410-2 to 410-N have the same internal configuration as that of the GOP feature extraction unit 410-1, and include convolutional layer units 411-2 to 411-N, downsampling units 412-2 to 412-N, and nonlinear function units 413-2 to 413-N, respectively.

The convolutional layer units 411-1 to 411-N apply the filter coefficient stored in the learning data storage unit 421 to input information to perform convolutional computation. The downsampling units 412-1 to 412-N perform downsampling on information output by the corresponding convolutional layer units 411-1 to 411-N. The nonlinear function units 413-1 to 413-N perform a nonlinear function process on information output by the corresponding down-sampling units 412-1 to 412-N.

That is, the GOP feature extraction unit 410 regards each piece of image information included in the GOP as a channel, captures the image information, and repeats the convolution computation, the downsampling, and the nonlinear function process on each channel N times to calculate a feature amount of the GOP. A value of N is an integer equal to or greater than 1.

The fully connected layer 420 includes one output node and multiple input nodes, and fully couples the input node that captures the feature amount output by the GOP feature extraction unit 410, the input node to which a picture type list is provided, and the input node to which the initial QP is provided, to the output node. Further, the fully connected layer 420 performs a computation for multiplying the feature amount output by the GOP feature extraction unit 410 and the initial QP by the weighting factor stored in the learning data storage unit 421, and outputs an output value based on the computation result.

The code amount calculation unit 434 sets each of the output values output by the fully connected layer 420 when the image information included in the GOP and the picture type corresponding to the image information are provided as input information, as a picture complexity $X_{pic}(j)$ for each piece of image information, and calculates a picture target code amount $T_{pic}(j)$ of each piece of image information using Equation (19) below on the basis of the picture complexity $X_{pic}(j)$ and the bit rate.

[Math. 19]

$$T_{pic}(k) = \text{GOP\_rate} \times X_{pic}(k) \Big/ \sum_{i=1}^{GOP\_cnt} X_{pic}(i) \qquad (19)$$

In Equation (19), GOP_rate is a rate when the bit rate is converted into a GOP, and GOP_cnt is the number of pieces of image information included in the GOP. Further, the code amount calculation unit 434 outputs the calculated picture target code amount Tpic(j) of each piece of image information to the initial QP estimation unit 10a.

The switching unit 430 includes a switch, connects the output terminal of the fully connected layer 420 to a terminal connected to the error calculation unit 431 when the learning process is performed, and connects the output of the fully connected layer 420 to a terminal connected to the code amount calculation unit 434 when the coding process is operated.

The training complexity information storage unit 432 stores a picture complexity as training information in advance. The error calculation unit 431 calculates an error between the output value of the code amount calculation unit 434 output by the switching unit 430 and the training information stored in the training complexity information storage unit 432. Further, when the calculated error becomes equal to or smaller than the predetermined threshold value, the error calculation unit 431 outputs instruction information to the switching unit 430 so that the switch is switched and the output terminal of the fully connected layer 420 is connected to the terminal connected to the code amount calculation unit 434.

The learning processing unit 433 calculates new learning data so that the error is reduced on the basis of the error calculated by the error calculation unit 431, and updates the learning data stored in the learning data storage unit 421 with the calculated learning data through rewriting. As a calculation scheme for reducing the error, for example, an error back propagation method or the like is applied.

Figure 9:
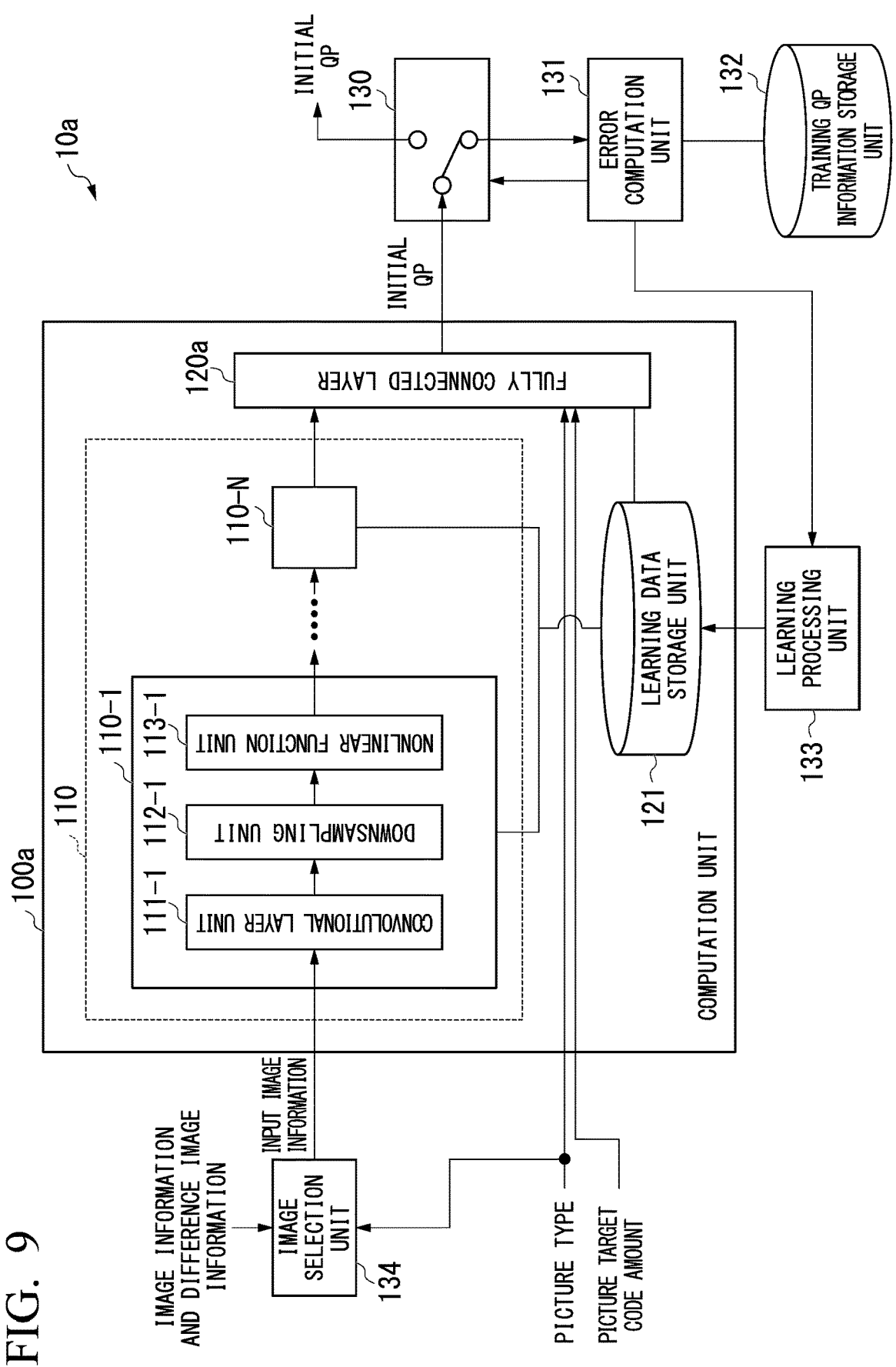
FIG. 9 is a block diagram illustrating a configuration of an initial QP estimation unit of the embodiment.

FIG. 9 is a block diagram illustrating an internal configuration of the initial QP estimation unit 10a. Components the same as those of the initial QP estimation unit 10 of the first embodiment are denoted by the same reference signs, and different components will be hereinafter described.

The initial QP estimation unit 10a, for example, estimates a relationship between the input image information that is any one of the image information and the difference image information, the picture type corresponding to the input image information, the picture target code amount, and the initial QP through the learning process according to a machine learning model, and generates relationship information indicating the estimated relationship as a learned model.

The initial QP estimation unit 10 calculates the initial QP on the basis of the input image information that is a coding target, the picture type of the input image information that is a coding target, and the picture target code amount output by the GOP target code amount estimation unit 18 using the generated relationship information at the time of an operation of the coding process.

The initial QP estimation unit 10a includes a computation unit 100a, a switching unit 130, an error calculation unit 131, a training QP information storage unit 132, a learning processing unit 133, and an image selection unit 134. The computation unit 100a includes a feature extraction unit 110, a fully connected layer 120a, and a learning data storage unit 121.

The fully connected layer 120a includes one output node and multiple input nodes, and fully couples the input node that captures the feature amount output by the feature extraction unit 110, the input node to which a picture type is provided, and the input node to which a picture target code amount is provided, to the output node. Further, the fully connected layer 120a performs a computation for multiplying the feature amount output by the feature extraction unit 110, the picture type, and the picture target code amount by the weighting factor stored in the learning data storage unit 121, and outputs an output value based on the computation result.

When the picture type of the image information is a P picture or a B picture, the image selection unit 134 selects the difference image information output by the subtractor 19 and outputs the selected difference image information as input image information to the computation unit 100a. Further, when the picture type of the image information is an I picture, the image selection unit 134 selects the image information output by the GOP division unit 41 and outputs the selected image information as input image information to the computation unit 100a.

Figure 10:
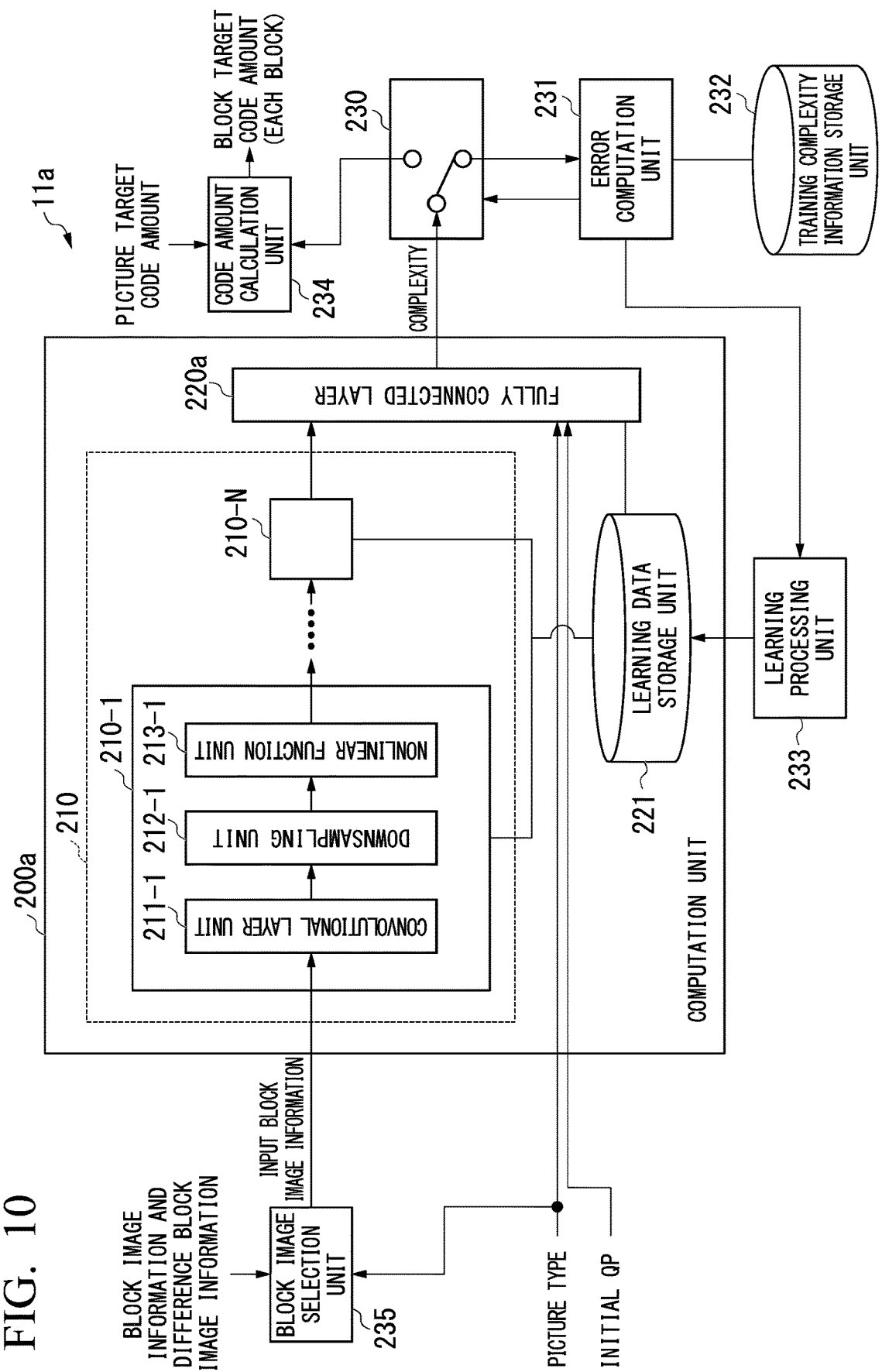
FIG. 10 is a block diagram illustrating a configuration of a block target code amount estimation unit of the embodiment.

FIG. 10 is a block diagram illustrating an internal configuration of the block target code amount estimation unit 11a. Components the same as those of the block target code amount estimation unit 11 of the first embodiment are denoted by the same reference signs, and different components will be hereinafter described.

The block target code amount estimation unit 11a estimates a relationship between input block image information, which is any one of the block image information and the difference block image information, the picture type corresponding to the input block image information, the initial QP, and the complexity according to a machine learning model through a learning process, and generates information indicating the estimated relationship as a learned model.

The block target code amount estimation unit 11a calculates the block target code amount on the basis of the input block image information that is a coding target, a picture type of the input block image information that is a coding target, the initial QP output by the initial QP estimation unit 10a, and the picture target code amount output by the GOP target code amount estimation unit 18 using the generated relationship information when the coding process is operated.

The block target code amount estimation unit 11a includes a computation unit 200a, a switching unit 230, an error calculation unit 231, a training complexity information storage unit 232, a learning processing unit 233, a code amount calculation unit 234, and a block image selection unit 235. The computation unit 200a includes a feature extraction unit 210, a fully connected layer 220a, and a learning data storage unit 221.

The fully connected layer 220a includes one output node and multiple input nodes, and fully couples the input node that captures the feature amount output by the feature extraction unit 210, the input node to which a picture type is provided, and the input node to which an initial QP is provided, to the output node. Further, the fully connected layer 220a performs a computation for multiplying the feature amount output by the feature extraction unit 210, the picture type, and the initial QP by the weighting factor stored in the learning data storage unit 221, and outputs an output value based on the computation result.

The code amount calculation unit 234 sets the output value output by the fully connected layer 220 as a complexity X(j) of the block image information, and calculates a target code amount T(j) of the block image information on the basis of the complexity X(j) and the picture target code amount Tpic(j) output by the GOP target code amount estimation unit 18 using Equation (20) below.

[Math. 20]

$$T(j) = T_{pic}(k) \times X(j) \Big/ \sum_{i=1}^{Blk\_cnt} X(i) \qquad (20)$$

In Equation (20), Blk_cnt is the number of blocks included in the image information including the block image information that is a target.

When the picture type of the image information including the target block image information is a P picture or a B picture, the block image selection unit 235 selects the difference block image information output by the subtractor 31 and outputs the selected difference block image information as the input block image information to the computation unit 200a. Further, when the picture type of the image information is an I picture, the block image selection unit 235 selects the block image information output by the block partition unit 30 and outputs the selected block image information as the input block image information to the computation unit 200a.

(QP Calculation Process in Second Embodiment)

Figure 11:
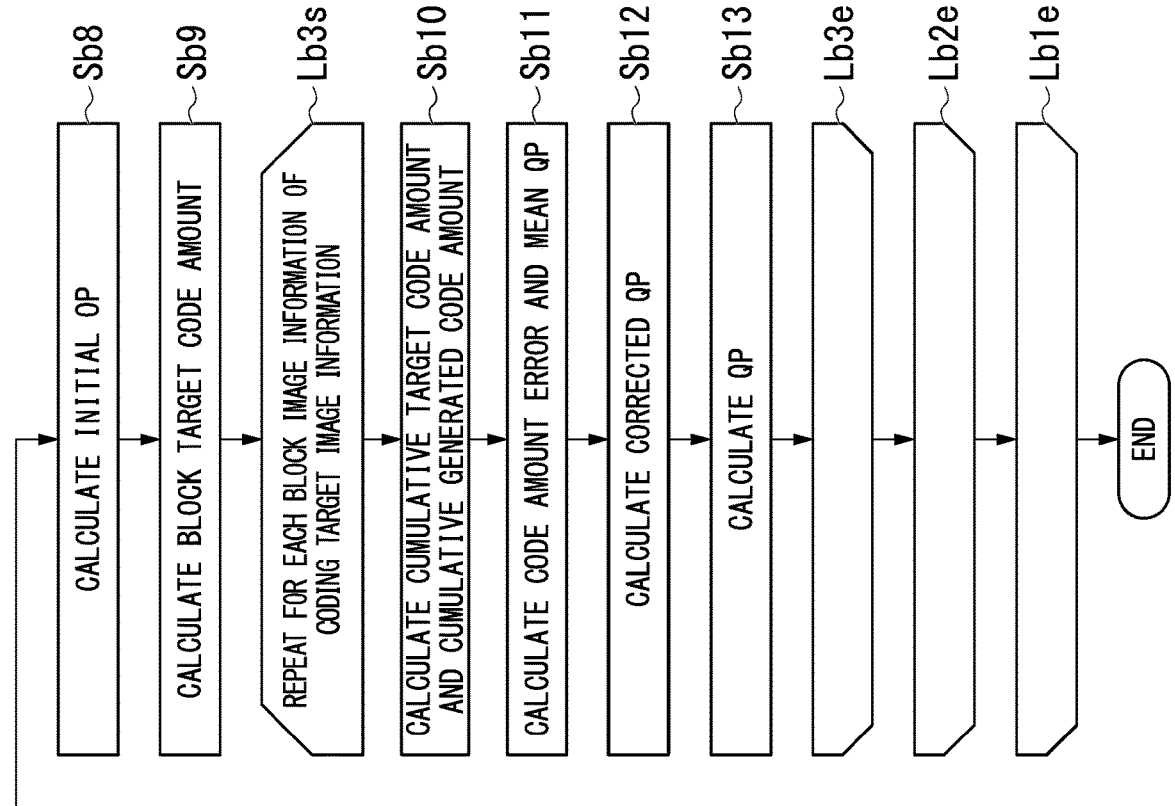
FIG. 11 is a flowchart illustrating a flow of a process in a code amount control unit of the embodiment.
Figure 11:
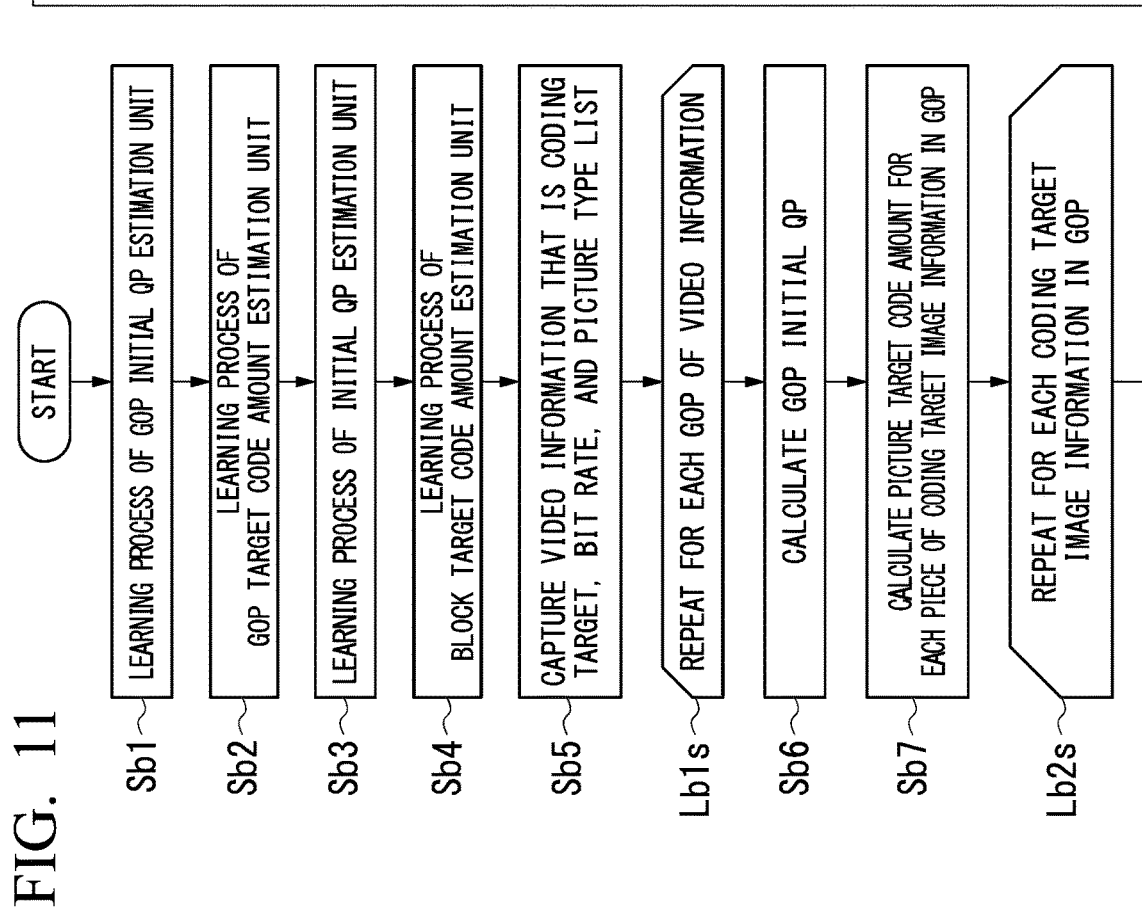

Next, a QP calculation process in the code amount control unit 1a will be described. FIG. 11 is a flowchart illustrating a flow of the QP calculation process. The process illustrated in FIG. 11 is divided into a learning process and a coding process. After the learning process in steps Sb1 to Sb4 is completed and learned data is generated, the video coding device Ca in a process from step Sb5 captures video information that is a coding target and performs the coding process. The GOP initial QP estimation unit 17 generates relationship information indicating a relationship between the GOP, the bit rate, the picture type list, and the GOP initial QP through the learning process (step Sb1).

In order to cause the GOP initial QP estimation unit 17 to perform the learning process for generating the learned data, that is, the relationship information, probability distribution information of the GOP for learning, probability distribution information of the bit rate corresponding to the GOP, and probability distribution information of the picture type list corresponding to the GOP are prepared as the input information in advance. Further, when the GOP is coded, probability distribution information of the QP that is closest to the corresponding bit rate is prepared as the training information.

The QP probability distribution information is stored in the training QP information storage unit 332 as training information, and the switch of the switching unit 330 is switched so that the output terminal of the fully connected layer 320 is connected to the terminal connected to the error calculation unit 331. The GOP feature extraction unit 310 captures the probability distribution information of the GOP for learning, and the fully connected layer 320 captures a bit rate for learning and the probability distribution information of the picture type list, so that the GOP initial QP estimation unit 17 starts the learning process.

When the error calculated by the error calculation unit 331 is, for example, equal to or smaller than the predetermined threshold value, the learning process ends, and the error calculation unit 331 outputs the instruction information to the switching unit 330. The switching unit 330 receives the instruction information, switches the switch, and sets the connection destination of the output terminal of the fully connected layer 320 to the GOP target code amount estimation unit 18. At this timing, the learned data stored in the learning data storage unit 321 becomes relationship information indicating a relationship between the GOP, the bit rate corresponding to the GOP, the picture type list corresponding to the GOP, and the GOP initial QP described above.

The GOP target code amount estimation unit 18 generates the relationship information indicating the relationship between the GOP, the picture type list, the GOP initial QP, and the picture complexity through the learning process (step Sb2).

In order to cause the GOP target code amount estimation unit 18 to perform the learning process for generating the learned data, that is, the relationship information, probability distribution information of the GOP for learning, probability distribution information of the picture type list corresponding to the GOP, and probability distribution information of the GOP initial QP corresponding to the GOP are prepared as the input information in advance. Further, the probability distribution information of the picture complexity when each piece of image information included in the GOP is coded with the corresponding GOP initial QP is prepared as training information.

The probability distribution information of the picture complexity is stored in the training complexity information storage unit 432 as training information, and the switch of the switching unit 430 is switched so that the output terminal of the fully connected layer 420 is connected to the terminal connected to the error calculation unit 431. The GOP feature extraction unit 410 captures the probability distribution information of the GOP for learning, and the fully connected layer 420 capturing a picture type list for learning and the probability distribution information of initial QP, so that the GOP target code amount estimation unit 18 starts the learning process.

When the error calculated by the error calculation unit 431 is, for example, equal to or smaller than the predetermined threshold value, the learning process ends, and the error calculation unit 431 outputs instruction information to the switching unit 430. The switching unit 430 receives the instruction information, switches the switch, and sets a connection destination of the output terminal of the fully connected layer 420 to the code amount calculation unit 434. At this timing, the learned data stored in the learning data storage unit 421 becomes the relationship information indicating a relationship between the GOP, the picture type list corresponding to the GOP, the GOP initial QP corresponding to the GOP, and the picture complexity described above.

The initial QP estimation unit 10a generates relationship information indicating a relationship between the image information and the difference image information, the picture type, the picture target code amount, and the initial QP through the learning process (step Sb3).

In order to cause the initial QP estimation unit 10a to perform the learning process for generating the learned data, that is, the relationship information, probability distribution information of input image information for learning, probability distribution information of the picture type corresponding to the input image information, and probability distribution information of the picture target code amount corresponding to the input image information are prepared as the input information in advance. Further, when the image information corresponding to the input image information is coded, probability distribution information of the QP that is closest to the corresponding picture target code amount is prepared as training information.

The QP probability distribution information is stored in the training QP information storage unit 132 as training information, and the switch of the switching unit 130 is switched so that the output terminal of the fully connected layer 120a is connected to the terminal connected to the error calculation unit 131. The image selection unit 134 outputs any one of the image information and the difference image information as the input image information to the feature extraction unit 110 according to the picture type. The feature extraction unit 110 captures the probability distribution information of the input image information for learning output from the image selection unit 134, and the fully connected layer 120a captures the picture type list for learning and the probability distribution information of the picture target code amount, so that the initial QP estimation unit 10a starts the learning process.

When the error calculated by the error calculation unit 131 is, for example, equal to or smaller than the predetermined threshold value, the learning process ends, and the error calculation unit 131 outputs the instruction information to the switching unit 130. The switching unit 130 receives the instruction information, switches the switch, and sets the connection destination of the output terminal of the fully connected layer 120a to the block target code amount estimation unit 11a. At this timing, the learned data stored in the learning data storage unit 121 becomes relationship information indicating a relationship between the input image information, the picture type corresponding to the input image information, the picture target code amount corresponding to the input image information, and the initial QP described above.

The block target code amount estimation unit 11a generates a relationship information indicating a relationship between the block image information, the picture type corresponding to the block image information, the initial QP corresponding to the block image information, and the complexity through the learning process (step Sb4).

In order to cause the block target code amount estimation unit 11a to perform the learning process for generating the learned data, that is, the relationship information, probability distribution information of input block image information for learning, probability distribution information of the picture type corresponding to the input block image information, and probability distribution information of the initial QP corresponding to the input block image information are prepared as input information in advance. Further, probability distribution information of the complexity when the block image information corresponding to the input block image information is coded by the corresponding initial QP is prepared as training information.

The probability distribution information of the complexity is stored as training information in the training complexity information storage unit 232, and the switch of the switching unit 230 is switched so that the output terminal of the code amount calculation unit 234 is connected to a terminal connected to the error calculation unit 231. The block image selection unit 235 outputs any one of the block image information and the difference block image information to the feature extraction unit 210 as input block image information according to the picture type. The feature extraction unit 210 captures the probability distribution information of the input block image information for learning output by the block image selection unit 235, and the fully connected layer 220a captures the picture type for learning and the probability distribution information of the initial QP, so that the block target code amount estimation unit 11a starts the learning process.

When the error calculated by the error calculation unit 231 is, for example, equal to or smaller than the predetermined threshold value, the learning process ends, and the error calculation unit 231 outputs the instruction information to the switching unit 230. The switching unit 230 receives the instruction information, switches the switch, and sets the connection destination of the output terminal of the fully connected layer 220a to the cumulative target code amount calculation unit 12. At this timing, the learned data stored in the learning data storage unit 221 becomes the relationship information indicating the relationship between the input block image information, the picture type corresponding to the input block image information, the initial QP corresponding to the input block image information, and the complexity described above.

The video coding device Ca captures the video information that is a coding target, the bit rate required for the video information that is a coding target, and the picture type list corresponding to the configuration of the GOP of the video information that is a coding target (step Sb5). When the code amount control unit 1a captures the bit rate required for the video information that is a coding target and the picture type list corresponding to the configuration of the GOP of the video information that is a coding target, the code amount control unit 1a repeatedly performs processes of step Sb6, step Sb7, and loops Lb2s to Lb2e on each GOP included in the video information (loops Lb1s to Lb1e).

The computation unit 300 of the GOP initial QP estimation unit 17 captures the GOP of the coding target output by the GOP division unit 41, the bit rate, and the picture type list. The GOP feature extraction unit 310 calculates the feature amount of the captured GOP of the coding target using the learned data stored in the learning data storage unit 321. The fully connected layer 320 calculates the GOP initial QP on the basis of the feature amount output by the GOP feature extraction unit 310, the bit rate, the picture type, and the learned data stored in the learning data storage unit 121. The GOP initial QP estimation unit 17 outputs the calculated GOP initial QP to the GOP target code amount estimation unit 18 (step Sb6).

The GOP target code amount estimation unit 18 captures the GOP of the coding target output by the GOP division unit 41, the GOP initial QP output by the GOP initial QP estimation unit 17, and the picture type list. The computation unit 400 of the GOP target code amount estimation unit 18 captures the GOP of the coding target, the GOP initial QP corresponding to the GOP, and the picture type list corresponding to the GOP.

The GOP feature extraction unit 410 calculates a feature amount of the captured GOP using the learned data stored in the learning data storage unit 421. The fully connected layer 420 calculates the picture target code amount for each piece of coding target image information included in the GOP of the coding target on the basis of the feature amount output by the GOP feature extraction unit 410, the picture type list, the GOP initial QP, and the learned data stored in the learning data storage unit 421. The GOP target code amount estimation unit 18 outputs the calculated picture target code amount for each piece of coding target image information to the initial QP estimation unit 10a (step Sb7).

The initial QP estimation unit 10a and the block target code amount estimation unit 11a of the code amount control unit 1a repeatedly perform processes of step Sb8, step Sb9, and loops Lb3s to Lb3e on each piece of coding target image information included in the GOP (loops Lb2s to Lb2e).

The initial QP estimation unit 10a captures coding target difference image information that is a difference between the coding target image information output by the GOP division unit 41 or the coding target image information output by the subtractor 19 and the reference image information, the picture type corresponding to the coding target image information, and the picture target code amount corresponding to the coding target image information output by the GOP target code amount estimation unit 18.

The image selection unit 134 outputs any one of the coding target image information and the coding target difference image information to the feature extraction unit 110 as input image information that is a coding target according to the picture type. The feature extraction unit 110 calculates the feature amount of the input image information that is a coding target output by the image selection unit 134 using the learned data stored in the learning data storage unit 121.

The fully connected layer 120a calculates the initial QP on the basis of the feature amount output by the feature extraction unit 110, the picture type, the picture target code amount, and the learned data stored in the learning data storage unit 121. The initial QP estimation unit 10a outputs the calculated initial QP to the block target code amount estimation unit 11a (step Sb8).

The block target code amount estimation unit 11a captures the coding target block image information output by the block partition unit 30, the difference block image information that is a difference between the coding target block image information output by the subtractor 31 and the reference block image information, the picture type of the coding target block image information, and the initial QP output by the initial QP estimation unit 10a.

The block image selection unit 235 outputs any one of the coding target block image information and the coding target difference block image information to the feature extraction unit 210 as input block image information according to the picture type. The feature extraction unit 210 calculates the feature amount of the input block image information that is a coding target output by the block image selection unit 235 using the learned data stored in the learning data storage unit 221.

The fully connected layer 220a calculates the block target code amount on the basis of the feature amount output by the feature extraction unit 210, the initial QP, and the learned data stored in the learning data storage unit 221. The block target code amount estimation unit 11a outputs the calculated block target code amount to the cumulative target code amount calculation unit 12 (step Sb9).

Hereinafter, the quantization parameter correction unit 22 repeatedly performs the processes from step Sb10 to step Sb13 on each piece of block image information of the coding target image information (loops Lb3s to Lb3e). The cumulative target code amount calculation unit 12 calculates the cumulative target code amount Tsum, which is the cumulative value of the block target code amounts up to the block image information immediately before the block image information that is a coding target in the coding unit 3.

The cumulative generated code amount calculation unit 13 calculates a cumulative generated code amount Bsum, which is a cumulative value of the block generated code amount up to the block image information immediately before the block image information that is a coding target in the coding unit 3 among the block generated code amount output by the variable length coding unit 33 (step Sb10). The cumulative target code amount Tsum is expressed using Equation (21) below, and the cumulative generated code amount Bsum is expressed using Equation (22) below.

[Math. 21]

$$T_{sum} = \sum_{i=1}^{j-1} T(i) \qquad (21)$$

[Math. 22]

$$B_{sum} = \sum_{i=1}^{j-1} B(i) \qquad (22)$$

In Equation (22), B(i) is the block generated code amount of the i-th block image information.

The code amount error calculation unit 14 calculates the code amount error D using Equation (23) below on the basis of the cumulative generated code amount Bsum output by the cumulative generated code amount calculation unit 13 and the cumulative target code amount Tsum output by the cumulative target code amount calculation unit 12, and outputs the code amount error D to the final QP calculation unit 16.

[Math. 23]

$$D = B_{sum} - T_{sum} \qquad (23)$$

The mean QP calculation unit 15 captures the QP for each piece of block image information output by the final QP calculation unit 16, and calculates a mean QP that is a mean value of the QP up to the block image information immediately before the block image information that is a coding target in the coding unit 3 on the basis of Equation (24) below (step Sb11).

[Math. 24]

$$QP_{mean} = \sum_{i=1}^{j-1} QP(i)/(j-1) \qquad (24)$$

The final QP calculation unit 16 calculates deltaQP that is corrected QP using Equation (25) below (step Sb12).

[Math. 25]

$$\text{deltaQP} = \text{deltaQP}_{org} + \text{deltaQP}_{org}/\text{BlkProc\_cnt} \qquad (25)$$

In Equation (25), BlkProc_cnt denotes the number of coded blocks in the coding target image information output by the variable length coding unit 33. Further, deltaQPorg denotes a value obtained from the code amount error D calculated by the code amount error calculation unit 14 on the basis of Equation (26) below, and k denotes an adjustment parameter coefficient.

[Math. 26]

$$\text{deltaQP}_{org} = k \times D \qquad (26)$$

The final QP calculation unit 16 calculates the final QP on the basis of the mean QP (QPmean) output by the mean QP calculation unit 15 and the calculated corrected QP (deltaQP) using Equation (27) below, and outputs the final QP to the orthogonal transformation and quantization unit 32 (step Sb13).

[Math. 27]

$$QP = \text{Round}(QP_{mean} + \text{deltaQP}) \quad (27)$$

A Round( ) function in Equation (27) means a function that performs rounding computation such as rounding up, rounding down, and rounding off. The coding unit 3a performs coding of each piece of block image information using the QP output for each piece of block image information by the code amount control unit 1a, and repeats the process until the coding of all pieces of block image information ends.

Figure 12:
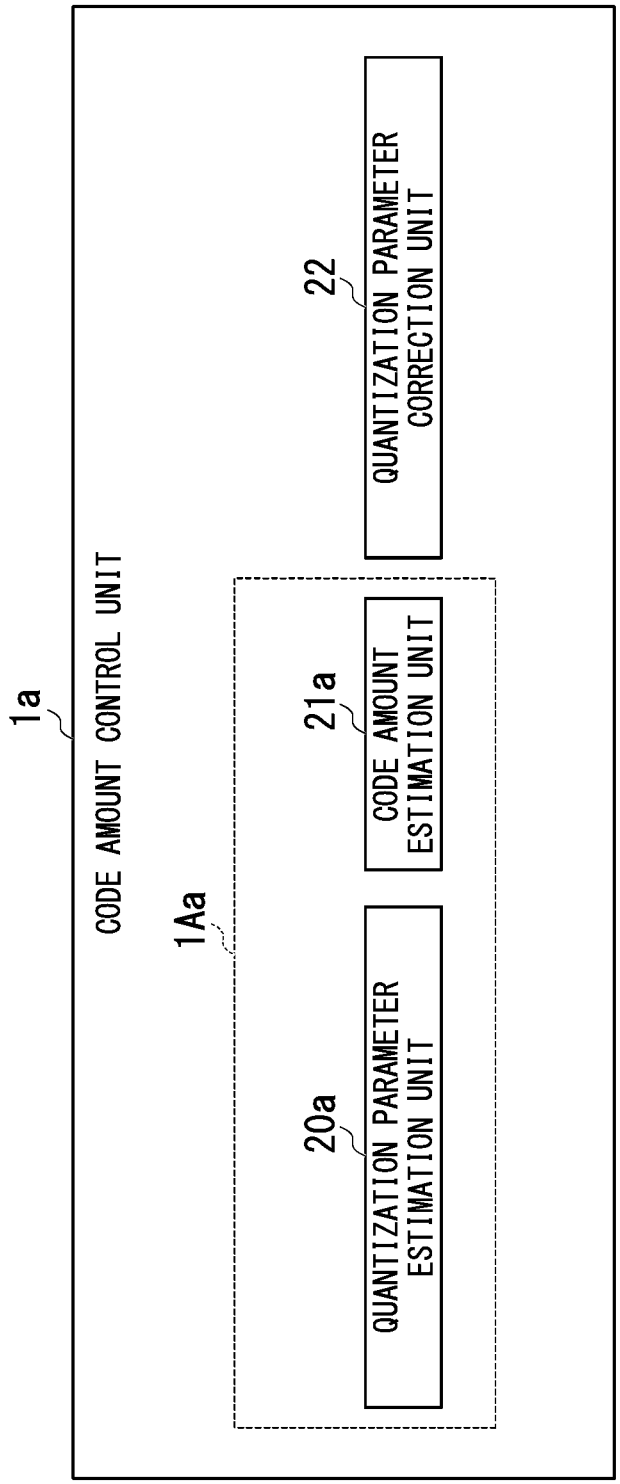
FIG. 12 is a diagram illustrating another configuration example of the code amount control unit in the embodiment.

In the code amount control unit 1a of the second embodiment, the quantization parameter estimation unit 20a and the code amount estimation unit 21a may be configured as one code amount estimation device 1Aa, as illustrated in FIG. 12.

Figure 13:
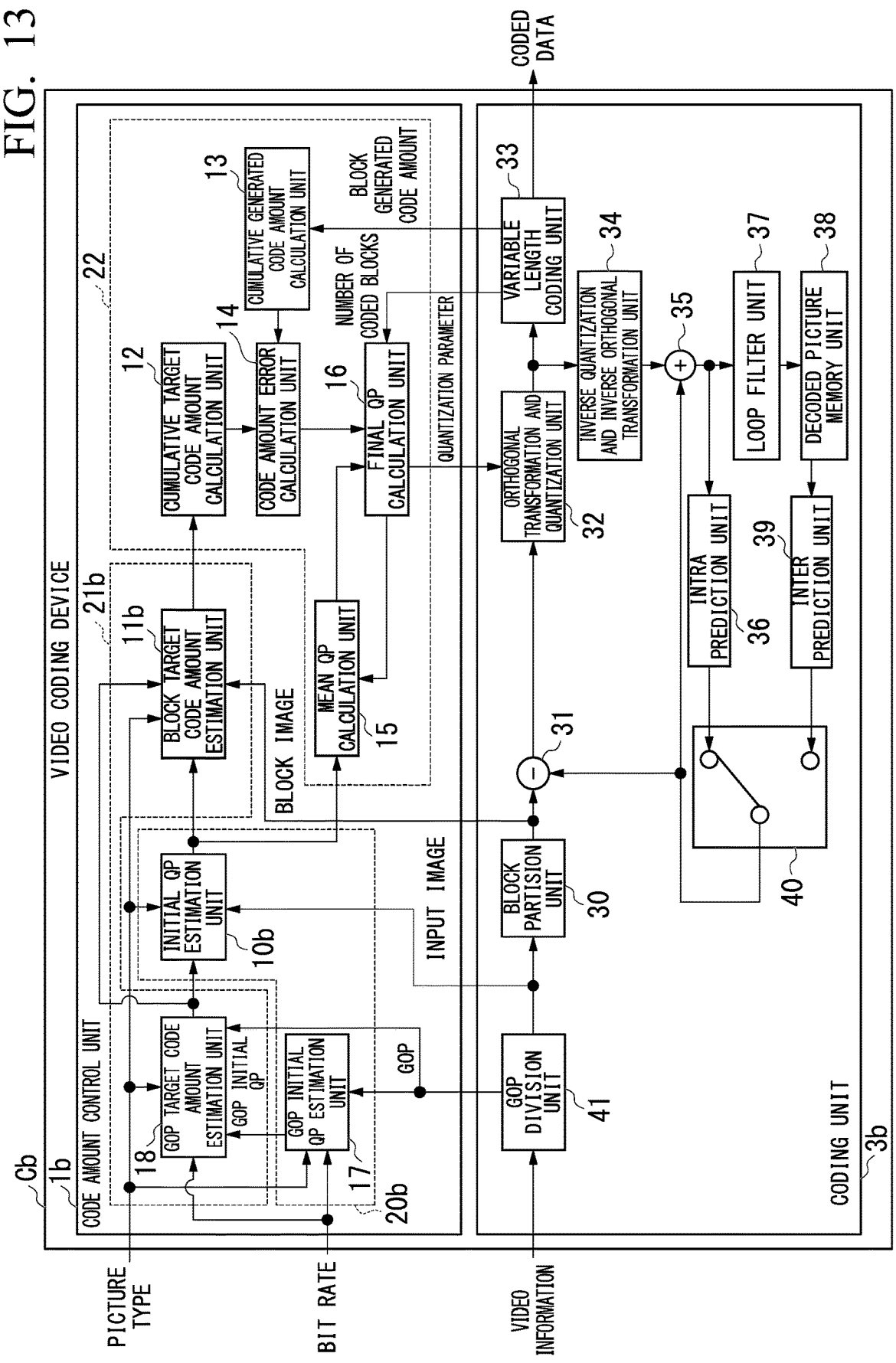
FIG. 13 is a diagram illustrating another configuration example of the video coding device in the embodiment.

Further, in the configuration of the second embodiment, the image selection unit 134 of the initial QP estimation unit 10a selects the difference image information in the case of a P picture or B picture, and selects the image information in the case of an I picture. Further, the block image selection unit 235 of the block target code amount estimation unit 11a selects the difference image information in the case of the P picture or the B picture, and selects the block image information in the case of the I picture. However, the configuration of the invention is not limited to this embodiment. For example, the video coding device Cb as illustrated in FIG. 13 may be configured, and the initial QP estimation unit 10b may perform processing using only the image information as the above-described input image information regardless of the picture type, and the block target code amount estimation unit 11b may also perform processing using only the block image information as the above-described input block image information regardless of the picture type. In this case, the configuration of the initial QP estimation unit 10b is a configuration obtained by removing the image selection unit 134 from the initial QP estimation unit 10a, and the configuration of the block target code amount estimation unit 11b is a configuration obtained by removing the block image selection unit 235 from the block target code amount estimation unit 11a.

With the configuration of the second embodiment, the quantization parameter estimation unit 20a estimates the initial QP to be applied to the image information on the basis of the image information and the desired picture target code amount required in coding. The code amount estimation unit 21a estimates the block target code amount for each piece of block image information on the basis of the initial QP and the block image information obtained by dividing the image information into blocks.

That is, in the configuration of the second embodiment, when the picture target code amount to be assigned to each piece of image information included in the video information is calculated, the GOP initial QP estimation unit 17 estimates the relationship between the GOP, the bit rate, the picture type, and the GOP initial QP through the learning process using the machine learning model, and generates the learned data obtained through the learning process as the relationship information indicating the relationship in advance. Further, the GOP target code amount estimation unit 18 estimates the relationship between the GOP, the picture type, the GOP initial QP, and the complexity through the learning process using the machine learning model, and generates the learned data obtained through the learning process as the relationship information indicating the relationship in advance. The initial QP estimation unit 10a estimates the relationship between the input image information, the picture type, the picture target code amount, and the initial QP through the learning process using the machine learning model, and generates the learned data obtained through the learning process as the relationship information indicating the relationship in advance. Further, the block target code amount estimation unit 11a estimates the relationship between the input block image information, the picture type, the initial QP, and the complexity through the learning process using the machine learning model, and generates the learned data obtained through the learning process as the relationship information indicating the relationship in advance.

The GOP initial QP estimation unit 17 calculates the GOP initial QP from the GOP of the coding target, the bit rate corresponding to the GOP, and the picture type list corresponding to the GOP using the generated relationship information. The GOP target code amount estimation unit calculates the picture target code amount for each piece of coding target image information included in the GOP of the coding target from the GOP of the coding target, the picture type list corresponding to the GOP, and the GOP initial QP output by the GOP initial QP estimation unit 17 using the generated relationship information. The initial QP estimation unit 10a calculates the initial QP from the input image information that is a coding target, the picture type corresponding to the input image information, and the picture target code amount corresponding to the input image information using the relationship information generated in advance. The block target code amount estimation unit 11a calculates the block target code amount from the input block image information that is a coding target, the picture type corresponding to the input block image information, and the initial QP using the relationship information generated in advance.

Therefore, it becomes possible to calculate the picture target code amount according to the feature of the GOP of the coding target and the bit rate, to further calculate the block target code amount according to the picture target code amount and the feature of the coding target image information, to perform appropriate code amount control in units of GOPs, and to assign an appropriate QP to each piece of block image information. Thereby, it becomes possible to perform assignment of a more accurate code amount obtained by setting a desired code amount, for example, a desired file size while maintaining image quality of the image information that is a coding target uniform.

In the first and second embodiments, the mean QP calculation unit 15 captures the initial QP output by the initial QP estimation units 10 and 10a as the initial value for first block image information, and outputs the captured initial QP to the final QP calculation unit 16 as it is instead of the mean QP. Further, in the case of the first block image information, the code amount error calculation unit 14 outputs the code amount error D=0, and thus, deltaQPorg=0 according to Equations (17) and (26). In two items of Equation (16) and Equation (25), deltaQPorg is "0", and the number of coded blocks BlkProc_cnt is also "0". Therefore, for the first block image information, the final QP calculation unit 16 sets deltaQP=0. Thus, the final QP calculation unit 16 sets the QP to be applied to the first block image information as the initial QP (QPinit) on the basis of Equations (18) and (27).

Further, in the first and second embodiments, since the learning process may be performed in parallel, the steps Sa1 and Sa2 of the flowchart of FIG. 4 may be performed in parallel, and the steps Sb1, Sb2, Sb3, and Sb4 in FIG. 11 may be performed in parallel. Further, N, which is the number of the feature extraction units 110 and 210 and the GOP feature extraction units 310 and 410 in FIGS. 2, 3, and 7 to 10, may be a different value as long as N is an integer equal to or greater than 1.

Third Embodiment

Figure 14:
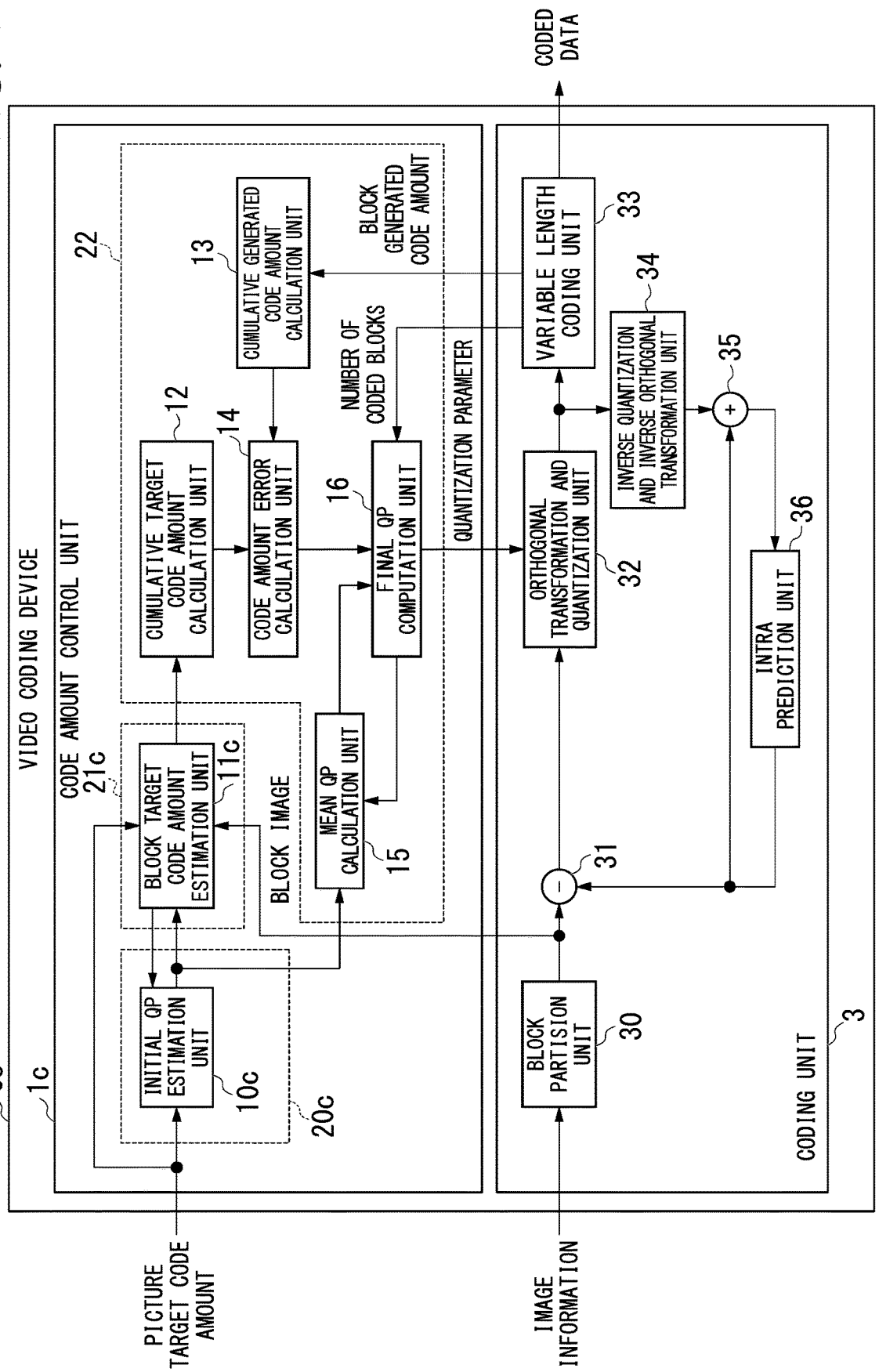
FIG. 14 is a block diagram illustrating a configuration of a video coding device according to a third embodiment of the invention.

FIG. 14 is a block diagram illustrating a configuration of a video coding device Cc in a third embodiment. In the video coding device Cc of the third embodiment, components the same as those of the video coding device C of the first embodiment are denoted by the same reference signs, and different configurations will be hereinafter described. The video coding device Cc includes a code amount control unit 1c and a coding unit 3. The coding unit 3 performs coding of video information that is a coding target according to a QP output from the code amount control unit 1c and outputs coded data.

The code amount control unit 1c includes a quantization parameter estimation unit 20c, a code amount estimation unit 21c, and a quantization parameter correction unit 22.

The quantization parameter estimation unit 20c includes an initial QP estimation unit 10c.

The code amount estimation unit 21c includes a block target code amount estimation unit 11c.

When the block target code amount estimation unit 11c acquires coding target block image information obtained through the division of a block partition unit 30, the block target code amount estimation unit 11c calculates a block estimation code amount X(j, qp) for all selectable QPs. This block estimation code amount X(j, qp) is a value indicating complexity for all selectable QPs for an input of each block image. The block target code amount estimation unit 11c outputs the calculated block estimation code amount X(j, qp) to the initial QP estimation unit 10c.

The initial QP estimation unit 10c acquires the block estimation code amount X(j, qp) for all the selectable QPs from the block target code amount estimation unit 11c. The initial QP estimation unit 10c calculates an initial QP (QPinit) on the basis of the acquired the block estimation code amount X(j, qp) using Equation (28) below.

[Math. 28]

$$QP_{init} = \mathrm{argmin}_{qp} \left| \sum_{j=1}^{Blk\_cnt} X(j, qp) - T_{pic} \right| \quad (28)$$

The initial QP estimation unit 10c outputs the calculated initial QP (QPinit) to the block target code amount estimation unit 11c and a mean QP calculation unit 15.

The block target code amount estimation unit 11c acquires the initial QP (QPinit) from the initial QP estimation unit 10c. The block target code amount estimation unit 11c calculates a target code amount of each block on the basis of the acquired initial QP (QPinit). The block target code amount estimation unit 11c outputs the estimated target code amount of each block to a cumulative target code amount calculation unit 12.

Figure 15:
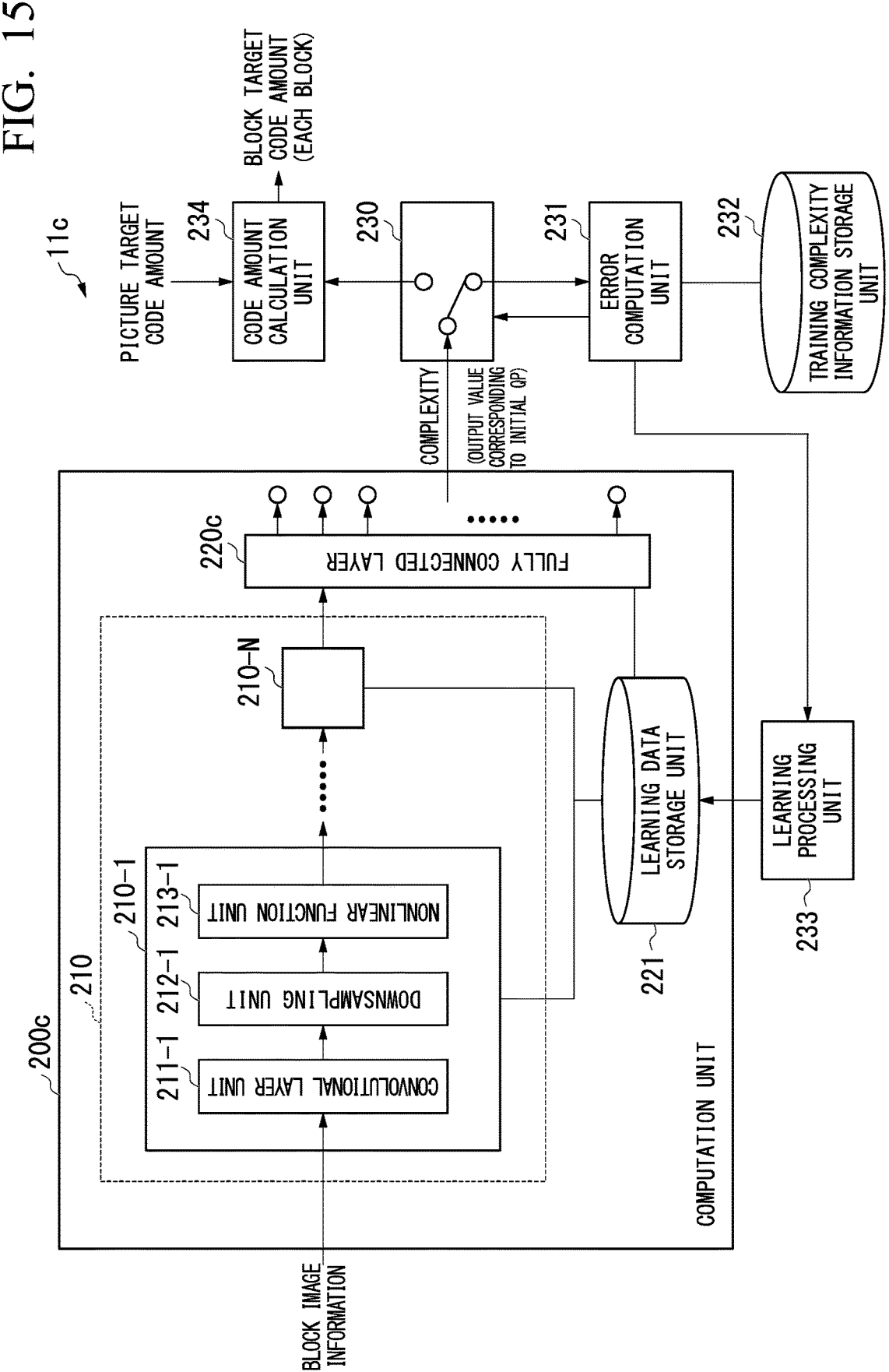
FIG. 15 is a block diagram illustrating a configuration of a block target code amount estimation unit of the embodiment.

FIG. 15 is a block diagram illustrating an internal configuration of the block target code amount estimation unit 11c. Differences from the internal configuration of the block target code amount estimation unit 11 of the first embodiment illustrated in FIG. 3 are as follows. In the block target code amount estimation unit 11 according to the first embodiment, the initial QP is input to the fully connected layer 220, whereas in the block target code amount estimation unit 11c according to the third embodiment, the initial QP is input to a fully connected layer 220c. Further, in the block target code amount estimation unit 11 according to the first embodiment, the number of outputs of the fully connected layer 220 is 1, whereas in the block target code amount estimation unit 11c according to the third embodiment outputs, the number of outputs of the fully connected layer 220c is the number of outputs corresponding to the number of all selectable QPs, and the block target code amount output to the code amount calculation unit 234 is an output value corresponding to the initial QP.

A learning method of machine learning in the block target code amount estimation unit 11c is as follows. Learning data in which the block image information, the QP, and the code amount form a set is prepared in advance, as in the learning method of machine learning in the block target code amount estimation unit 11c according to the first embodiment described with reference to FIG. 3. The learning data is data in which all the QPs and the respective code amounts when respective coding have been performed with all the QPs form a set for one piece of block image information. In the learning data, the set of these is converted into a database for each sample of multiple pieces of block image information. The learning data is not limited to the above configuration, and may be, for example, data in which respective code amounts when coding has been performed with at least one QP form a set for one piece of block image information.

The block target code amount estimation unit 11c, for example, inputs the block image information to a neural network so that the block image information forward propagates, and then calculates an error between an output value and the input code amount only for an output unit corresponding to the input QP so that the error backward propagates to thereby perform machine learning. The forward propagation and the backward propagation may be collectively performed in units of multiple samples.

(QP Calculation Process in Third Embodiment)

Figure 16:
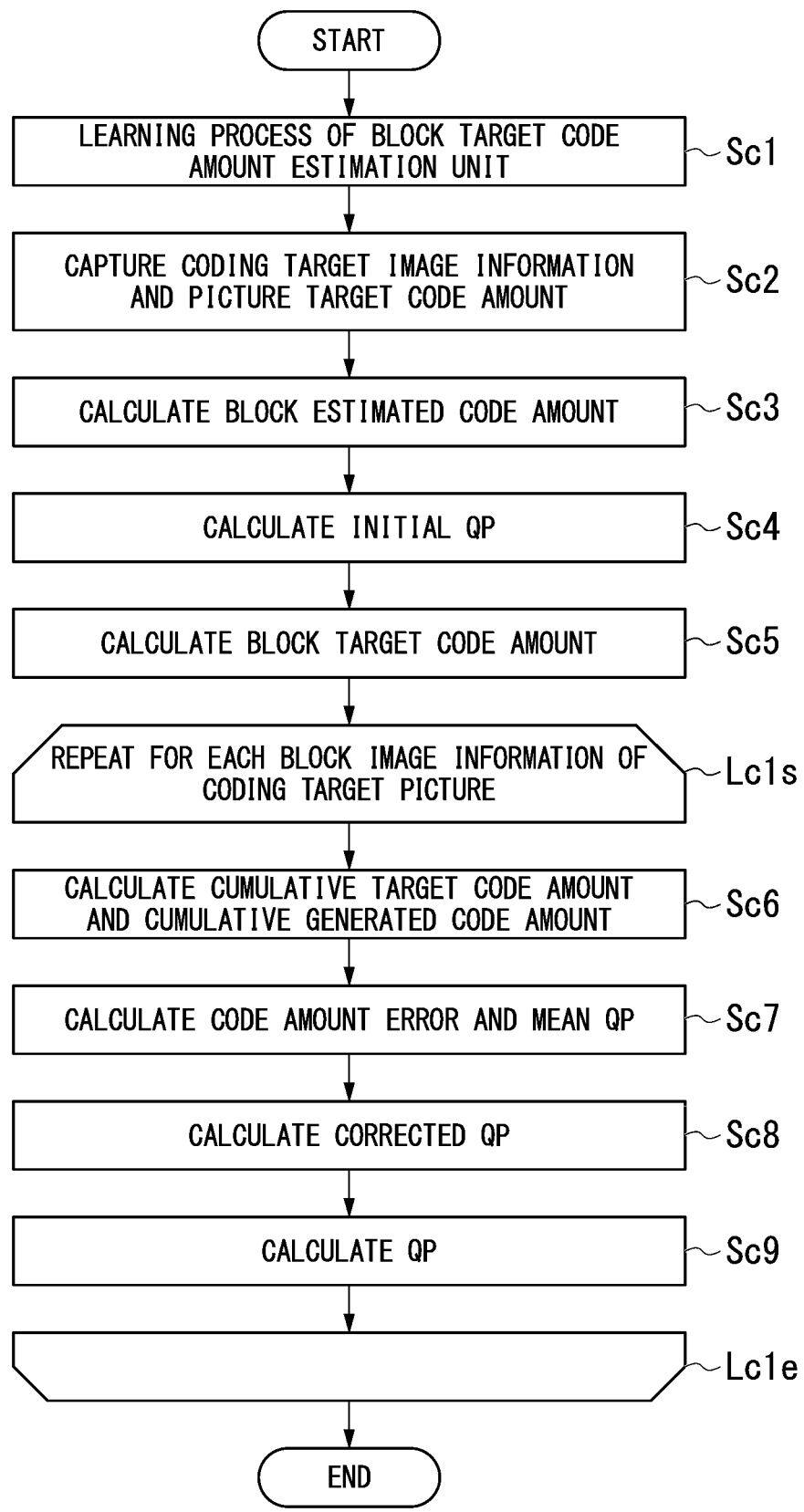
FIG. 16 is a flowchart illustrating a flow of a process in the code amount control unit of the embodiment.

Next, a QP calculation process in the code amount control unit 1c will be described. FIG. 16 is a flowchart illustrating a flow of the QP calculation process. The process illustrated in FIG. 16 is divided into a learning process and a coding process. In the process illustrated in FIG. 16, after the learning process in step Sc1 is completed and the learned data is generated, the image information that is a coding target is captured and the coding process is performed in processes of step Sc2 and subsequent steps.

The block target code amount estimation unit 11c generates learning data associated with the relationship information indicating the relationship between the block image information, the initial QP corresponding to the block image information, and the complexity through the learning process (step Sc1).

The video coding device Cc captures the coding target image information and a desired picture target code amount required for the coding target image information (step Sc2).

When the block image information is input, the block target code amount estimation unit 11c calculates the block estimation code amount X(j, qp) for all selectable QPs. The block target code amount estimation unit 11c outputs the calculated block estimation code amount X(j, qp) to the initial QP estimation unit 10c (step Sc3).

The initial QP estimation unit 10c acquires the block estimation code amount X(j, qp) for all selectable QPs from the block target code amount estimation unit 11c. The initial QP estimation unit 10c calculates the initial QP (QPinit) on the basis of the acquired block estimation code amount X(j, qp) using Equation (28) below.

The initial QP estimation unit 10c outputs the calculated initial QP (QPinit) to the block target code amount estimation unit 11c and the mean QP calculation unit 15 (step Sc4).

The block target code amount estimation unit 11c acquires the initial QP (QPinit) from the initial QP estimation unit 10c. The block target code amount estimation unit 11c calculates the target code amount X (j, QPinit) of each block on the basis of the acquired initial QP (QPinit). The block target code amount estimation unit 11c outputs the estimated target code amount X (j, QPinit) of each block to the cumulative target code amount calculation unit 12 (step Sc5).

Hereinafter, the quantization parameter correction unit 22 repeatedly processes from step Sc6 to step Sc9 on each piece of block image information of the coding target image information (loops Lc1s to Lc1e). Content of the processes of steps Sc6 to Sc9 is the same as the content of the processes of steps Sa6 to Sa9 described with reference to FIG. 4 in the first embodiment.

With the configuration of the third embodiment, the block target code amount estimation unit 11c (the code amount estimation unit) estimates the block target code amount (first target code amount) on the basis of block image information (first code amount estimation area) in an estimation target image (first image information), and a code amount estimation model for estimating the block target code amount (the first target code amount) for each piece of block image information using the block image information and all selectable QPs (multiple first quantization parameters determined in advance).

Further, the code amount estimation model is a model generated by associating block image information (second code amount estimation area) in an image for learning (second image information), multiple the QPs (second quantization parameters), and a block target code amount (second target code amount) for each piece of block image information (second code amount estimation area) when coding is performed with respective values of multiple the QPs with each other.

Further, the code amount estimation model performs updating of the association only in a case in which multiple the QPs (the second quantization parameters) are at least some of all selectable QPs (multiple first quantization parameters determined in advance) and the estimated block target code amount (the first target code amount) is the block target code amount when coding is performed with the quantization parameter present in both of all the selectable QPs (multiple first quantization parameters determined in advance) and multiple the QPs (the second quantization parameters).

Further, the code amount estimation model is a model for performing a learning process using learning data in which the block image information (the second code amount estimation area) in the image for learning (the second image information), multiple the QPs (the second quantization parameters) corresponding to the block image information (the second code amount estimation area), and relationship information indicating a relationship with complexity are associated with each other.

With the configuration of the third embodiment, it becomes possible to calculate the block target code amount according to the feature of the coding target image information and the desired picture target code amount, and to assign an appropriate QP to each piece of block image information. Thereby, it becomes possible to perform assignment of a more accurate code amount obtained by setting a desired code amount, for example, a desired file size while maintaining image quality of the image information that is a coding target uniform.

In the code amount control unit 1c of the third embodiment, the quantization parameter estimation unit 20c and the code amount estimation unit 21c may be configured as one code amount estimation device.

Further, in the first, second, and third embodiments, the initial QP estimation units 10 and 10a, the block target code amount estimation units 11, 11a and 11c, the GOP initial QP estimation unit 17, and the GOP target code amount estimation unit 18, for example, perform the learning process using the machine learning model, and FIGS. 2, 3, 7 to 10, and 15, for example, illustrate an example of a configuration of a deep neural network for performing deep learning. However, the invention is not limited to the embodiment, and the learning process may be performed by using a deep neural network having another different configuration, and a nonlinear function indicating the relationship may be obtained on the basis of mathematical computation means without performing the learning process and set as the relationship information, or any means may be used as long as the means is a predetermined estimation means for estimating the relationship.

In the first, second, and third embodiments, the initial QP estimation units 10 and 10a, the block target code amount estimation units 11, 11a, and 11c, the GOP initial QP estimation unit 17, and the GOP target code amount estimation unit 18 calculate the feature amount and the feature amount in the feature extraction units 110 and 210 and the GOP feature extraction units 310 and 410, but the configuration of the invention is not limited to the embodiment. When there are a sufficient number of input information, the learning process may be performed by directly providing the input information to the fully connected layer 320 without calculating the feature amount. Here, the input information is information of the image information, the picture target code amount, the block image information, the initial QP, the GOP, the bit rate, the picture type list, the GOP initial QP, the input image information, the picture type, the picture target code amount, and the input block image information provided in the learning process.

Further, in the first, second, and third embodiments, the error calculation units 131, 231, 331, and 431 end the learning process when the error becomes equal to or smaller than the threshold value, but the configuration of the invention is not limited to the embodiment. The determination as to "whether the error is equal to or smaller than the threshold value" is merely an example, and a determination as to "whether the error is smaller than the threshold value" may be made depending on a method of determining the threshold value. That is, in the threshold value determination process, a determination as to whether a determination target value is smaller than the threshold value may be made.

In the first, second, and third embodiments, a case in which the video coding devices C, Ca, and Cb are, for example, devices confirming to the H.265/High Efficiency Video Coding (HEVC) standard has been described, the devices are not limited to the standard and may be devices conforming to another standard.

Further, in the first, second, and third embodiments, a configuration in which, for example, the estimation of the block target code amount is performed on the block image information obtained by dividing the image information into blocks has been adopted, but the configuration of the invention is not limited to this embodiment. Further, all areas of the image information or any area may be set as the code amount estimation area, in addition to a case in which the block image information is set as an area on which the estimation of the code amount is performed and, for example, estimation of the target code amount of the code amount estimation area may be performed.

EXAMPLE

Hereinafter, experimental results when an experiment has been performed using an actual test image will be described.
(Implementation Conditions)
Implementation conditions of this experiment are as follows.
Image size of test image: 1920 [pixels]×1080 [pixels].
Types of test images: the following 37 types in total.
Images defined as Class B in Joint Collaborative Team on Video Coding (JCT-VC): five types.
Images released by Swedish Television (SVT): four types.
Images of Hi-Vision Test Sequence 2nd Edition (High-definition system evaluation moving image, 2nd edition) released by ITE/ARIB: 28 types.
Frame that is a coding target: Only a first frame.
Profile: Main 10 profile, All-Intra compression scheme.
Target code amount: any one of 3 Mbytes, 6 Mbytes, 9 Mbytes, and 12 Mbytes is set for each picture.
Related work (anchor) that is a comparison target: HM (HEVC Test Model) 16.6.
(Experimental environment)
An experimental environment for this experiment is as follows.
CPU: Only one core of Intel (registered trademark) Xeon (registered trademark) E54627 v3 (2.60 GHz).
Machine learning library: Tensorflow (software library for use in machine learning developed by Google (registered trademark) company in US and released as an open source).
(Learning Conditions)
Learning conditions of Convolutional Neural Network (CNN) in machine learning of this experiment are as follows.
Dataset: Div2K (DIVerce 2K resolution high quality images) (900 images, total number of samples 459,000).
Batch size: 512.
Optimization scheme: Adaptive Moment Estimation (Adam).
Learning rate: Exponential decay ($10^{-2}$ to $10^{-4}$).
Number of repetitions (number of epochs): 20.
(Experimental Results)
The experimental results of the experiment performed under the implementation conditions, experimental environment, and learning conditions are as follows.
Code Amount Error Rate
Related work: 0.79% on average.
Proposed work: 0.82% on average.
The code amount error rate is an error rate with respect to the target code amount set for each picture.
Processing Time Ratio
Proposed work: Average +0.34% with respect to the related work.
The processing time ratio is a ratio of processing time required for the entire coding process.
Coding Efficiency (Bit Rate Reduction Rate)
Proposed work: Average −2.16% and maximum −11.56% with respect to the related work.

The above experimental results showed that the proposed technology according to the invention improves coding efficiency as compared to the related work (HM 16.6) while curbing a coding error with respect to the target code amount and an amount of computation (a processing time) to the same extent as the related work.

The code amount estimation devices 1A and 1Aa in the embodiments described above may be realized by a computer. In this case, the code amount estimation devices 1A and 1Aa may be realized by recording a program for realizing this function on a computer-readable recording medium, loading the program recorded on the recording medium into a computer system, and executing the program. Here, the "computer system" includes an OS or hardware such as a peripheral device. Further, the "computer-readable recording medium" refers to a portable medium such as a flexible disk, a magneto-optical disc, a ROM, or a CD-ROM, or a storage device such as a hard disk built into in the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in a combination with a program previously stored in the computer system. Further, the program may be realized using a programmable logic device such as a field programmable gate array (FPGA).

REFERENCE SIGNS LIST 1, 1a, 1b, 1c Code amount control unit
10, 10a, 10b, 10c Initial QP estimation unit
11, 11a, 11b, 11c Block target code amount estimation unit
12 Cumulative target code amount calculation unit
13 Cumulative generated code amount calculation unit
14 Code amount error calculation unit
15 Mean QP calculation unit
16 Final QP calculation unit
17 GOP initial QP estimation unit
18 GOP target code amount estimation unit
19 Subtractor
20, 20a, 20c Quantization parameter estimation unit
21, 21a, 21c Code amount estimation unit
22 Quantization parameter correction unit
30 Block partition unit
31 Subtractor
32 Orthogonal transformation and quantization unit
33 Variable length coding unit
34 Inverse quantization and inverse orthogonal transformation unit
35 Adder
36 Intra prediction unit
100, 100a Computation unit
110 (110-1 to 110-N) Feature extraction unit
111-1 to 111-N Convolutional layer unit
112-1 to 112-N Downsampling unit
113-1 to 113-N Nonlinear function unit
120, 120a Fully connected layer
121 Learning data storage unit
130 Switching unit 131 Error calculation unit
132 Training QP information storage unit
133 Learning processing unit
134 Image selection unit
200, 200a, 200c Computation unit
210 (210)-1 to 210-N) Feature extraction unit
211-1 to 211-N Convolutional layer unit
212-1 to 212-N Downsampling unit
213-1 to 213-N Nonlinear function unit
220, 220a, 220c Fully connected layer
221 Learning data storage unit
230 Switching unit
231 Error calculation unit
232 Training complexity information storage unit
233 Learning processing unit
234 Code amount calculation unit
235 Block image selection unit
300 Computation unit
310 (310-1 to 310-N) Feature extraction unit
311-1 to 311-N Convolutional layer unit
312-1 to 312-N Downsampling unit
313-1 to 313-N Nonlinear function unit
320 Fully connected layer
321 Learning data storage unit
330 Switching unit
331 Error calculation unit
332 Training QP information storage unit
333 Learning processing unit
400 Computation unit
410 (410-1 to 410-N) Feature extraction unit
411-1 to 411-N Convolutional layer unit
412-1 to 412-N Downsampling unit
413-1 to 413-N Nonlinear function unit
420 Fully connected layer
421 Learning data storage unit
430 Switching unit
431 Error calculation unit
432 Training complexity information storage unit
433 Learning processing unit
434 Code amount calculation unit

The invention claimed is:

1. A code amount estimation device comprising:
a processor; and
a storage medium having computer program instructions stored thereon, wherein the computer program instructions, when executed by the processor, perform to:
estimate a first target code amount on the basis of a first code amount estimation area in first image information and a code amount estimation model for estimating the first target code amount for each first code amount estimation area using the first code amount estimation area and multiple first quantization parameters determined in advance,
wherein the code amount estimation model is a model generated by associating a second code amount estimation area in second image information, multiple second quantization parameters, and a second target code amount for each second code amount estimation area when coding is performed with respective values of multiple second quantization parameters with each other.

2. The code amount estimation device according to claim 1, wherein the code amount estimation model performs updating of the association only in a case in which multiple second quantization parameters are at least some of multiple first quantization parameters and the first target code amount is the first target code amount when coding is performed with the quantization parameters present in both of multiple first quantization parameters and multiple second quantization parameters among the estimated first target code amounts.

3. The code amount estimation device according to claim 1, wherein the code amount estimation model is a model for performing a learning process using learning data in which the second code amount estimation area in the second image information, multiple second quantization parameters corresponding to the second code amount estimation area, and relationship information indicating a relationship with complexity are associated with each other.

4. A code amount estimation method comprising:
estimating a first target code amount on the basis of a first code amount estimation area in first image information, and a code amount estimation model for estimating the first target code amount for each first code amount estimation area using the first code amount estimation area and multiple first quantization parameters determined in advance; and
generating the code amount estimation model by performing association of a second code amount estimation area in second image information, multiple second quantization parameters, and a second target code amount for each second code amount estimation area when coding is performed with respective values of multiple second quantization parameters with each other.

5. A non-transitory computer readable medium which stores a code amount estimation program for causing a computer to execute:
a code amount estimation step of estimating a first target code amount on the basis of a first code amount estimation area in first image information, and a code amount estimation model for estimating the first target code amount for each first code amount estimation area using the first code amount estimation area and multiple first quantization parameters determined in advance; and
a step of generating the code amount estimation model by performing association of a second code amount estimation area in second image information, multiple second quantization parameters, and a second target code amount for each second code amount estimation area when coding is performed with respective values of multiple second quantization parameters with each other.

* * * * *